(12) United States Patent
Pujar et al.

(10) Patent No.: US 12,318,964 B2
(45) Date of Patent: Jun. 3, 2025

(54) CONFORMABLE TOOLING SYSTEMS AND METHODS FOR COMPLEX CONTOUR COMPOSITE PREFORMS

(71) Applicant: ROHR, INC., Chula Vista, CA (US)

(72) Inventors: Vijay V. Pujar, San Diego, CA (US); Katherine E. Waugh, San Diego, CA (US); Christopher C. Koroly, Spring Valley, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 24 days.

(21) Appl. No.: 18/155,577

(22) Filed: Jan. 17, 2023

(65) Prior Publication Data

US 2024/0239012 A1 Jul. 18, 2024

(51) Int. Cl.
*B29C 70/46* (2006.01)
*B28B 7/16* (2006.01)
*B28B 7/34* (2006.01)
*B28B 23/22* (2006.01)
*C04B 35/83* (2006.01)

(52) U.S. Cl.
CPC ............... *B28B 23/22* (2013.01); *B28B 7/16* (2013.01); *B28B 7/34* (2013.01); *C04B 35/83* (2013.01); *C04B 2235/5248* (2013.01); *C04B 2235/614* (2013.01)

(58) Field of Classification Search
CPC ........... B28B 7/18; B29B 7/186; B29C 70/46; B29C 70/462; B29C 70/345
See application file for complete search history.

(56) References Cited

U.S. PATENT DOCUMENTS

| 1,482,555 A | * | 2/1924 | Hall | ......................... B60B 9/10 |
| 3,809,192 A | * | 5/1974 | Stehle | .................. F16D 65/128 |
| 5,108,691 A | * | 4/1992 | Elliott | .................. B29C 43/203 |
| 5,504,979 A | | 4/1996 | Sheehan et al. | |

425/37
188/218 XL
264/296

(Continued)

OTHER PUBLICATIONS

Patel, M. and D. Bhramhatt. "Needle punching technology." Faculty of Technology and Engineering, The Maharaja Sayajirao University of Baroda, Vadodara, India (2010) 10 pages. (Year: 2010).*

(Continued)

*Primary Examiner* — Matthew J Daniels
(74) *Attorney, Agent, or Firm* — SNELL & WILMER L.L.P.

(57) ABSTRACT

A preform tooling arrangement includes a base plate comprising a male die surface and a stripper plate comprising a female die surface. A plurality of perforations are disposed in the base plate and/or the stripper plate. The stripper plate is moveable with respect to the base plate. The preform tooling arrangement is configured to receive a fibrous preform between the male die surface and the female die surface. The preform tooling arrangement is a dual-purpose fixture configured to accommodate z-needling and densification, all while the fibrous preform remains in the same fixture (i.e., the preform tooling arrangement). The perforations are configured to receive one or more textile needles for through thickness reinforcement of the fibrous preform.

23 Claims, 13 Drawing Sheets

(56) References Cited

U.S. PATENT DOCUMENTS

| | | |
|---|---|---|
| 6,610,229 B1 | 8/2003 | Morales et al. |
| 9,682,516 B2 | 6/2017 | Lockett et al. |
| 10,906,205 B2 | 2/2021 | Thibaud et al. |
| 2010/0163167 A1 | 7/2010 | Maheshwari et al. |
| 2011/0277937 A1 | 11/2011 | Hethcock et al. |
| 2018/0274144 A1* | 9/2018 | Evrard .................... D04H 1/46 |
| 2019/0210304 A1 | 7/2019 | Wallace |
| 2020/0061868 A1 | 2/2020 | Thibaud et al. |

OTHER PUBLICATIONS

European Patent Office, European Search Report dated Jun. 5, 2024 in Application No. 23215088.8.

* cited by examiner

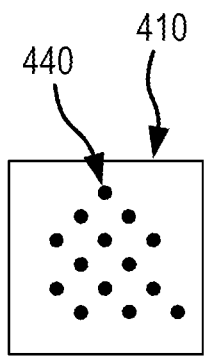 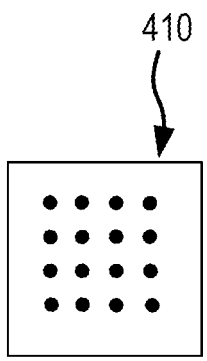 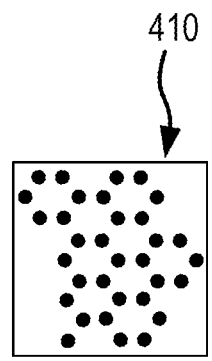 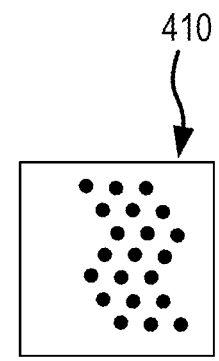
FIG. 15A  FIG. 15B  FIG. 15C  FIG. 15D
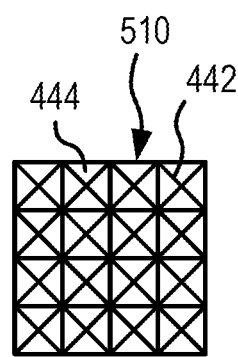 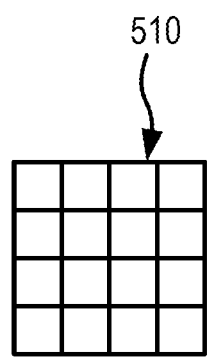 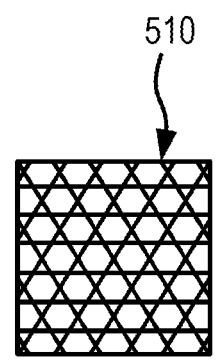
FIG. 16A  FIG. 16B  FIG. 16C
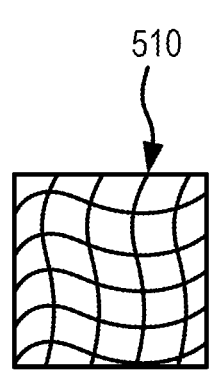 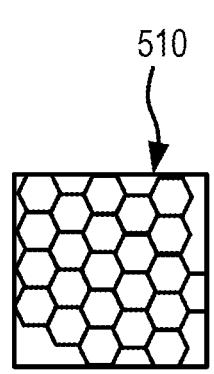 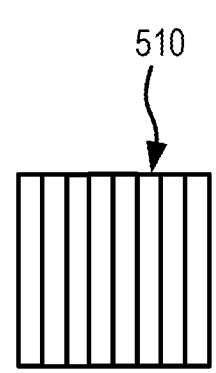
FIG. 16D  FIG. 16E  FIG. 16F

CONFORMABLE TOOLING SYSTEMS AND METHODS FOR COMPLEX CONTOUR COMPOSITE PREFORMS

FIELD

The present disclosure relates to systems and methods for manufacturing composites.

BACKGROUND

Composite bodies are utilized in various industries, including the aerospace industry. Typically, one or more layers of a composite material are stacked together over a mold. The layers may be needled with textile needling to generate a series of z-fibers that extend in the through-thickness direction of the stacked layers. In the case of C/C (carbon/carbon) composites, the shaped preform is then typically moved to one or more other fixtures as it goes through heat treatment and densification processes.

SUMMARY

According to various embodiments, a preform tooling arrangement is disclosed, comprising a base plate comprising a male die surface, a stripper plate comprising a female die surface, a first plurality of perforations disposed in the base plate, and a second plurality of perforations disposed in the stripper plate. The stripper plate is moveable with respect to the base plate, and the preform tooling arrangement is configured to receive a fibrous preform between the male die surface and the female die surface. Each perforation of the first plurality of perforations can be configured to receive a textile needle. Each perforation of the second plurality of perforations can be configured to receive a textile needle.

In various embodiments, the base plate comprises two or more base plate sub-components that are configured together to define the male die surface. In various embodiments, the stripper plate comprises two or more stripper plate sub-components that are configured together to define the female die surface.

In various embodiments, the first plurality of perforations extend from the male die surface to a recess surface in the base plate. In various embodiments, the second plurality of perforations extend from the female die surface to an outer surface in the stripper plate. In various embodiments, each of the second plurality of perforations are sized and configured to receive a textile needle. In various embodiments, each of the first plurality of perforations are sized and configured to receive the textile needle.

In various embodiments, each of the second plurality of perforations are sized and configured to receive the textile needle. Each of the first plurality of perforations can be sized and configured to receive the textile needle. A center axis of each perforation of the first plurality of perforations can be aligned with a center axis of a corresponding perforation of the second plurality of perforations. Each perforation of the second plurality of perforations disposed in the stripper plate can be configured to receive the textile needle therethrough, whereby the textile needle penetrates through said perforation, through the fibrous preform, and at least partially through the corresponding perforation of the first plurality of perforations disposed in the base plate.

In various embodiments, the male die surface is a convex surface and the female die surface is a concave surface.

In various embodiments, the base plate comprises a metallic material, a graphite material, a C/C composite material, and/or a ceramic matrix composite material, e.g., SiC/SiC material among others. In various embodiments, the stripper plate comprises a metallic material, a graphite material, a C/C composite material, and/or a ceramic matrix composite material, e.g., SiC/SiC material among others.

In various embodiments, the plurality of perforations in the base plate and stripper plate are configured to generate a plurality of perforation zones with different perforation densities, or number of perforations per unit area, and patterns, e.g., a rectangular pattern, a hexagonal pattern, a triangular pattern, a circular pattern, among others. In various embodiments, when the stripper plate is positioned over the base plate, the plurality of perforations in the stripper plate are configured to align with the plurality of perforations in the base plate.

In various embodiments, the plurality of perforations in the base plate and the stripper plate are configured to create a first zone with a first perforation density, and a second zone with a second perforation density, where the first perforation density is higher than the second perforation density.

In various embodiments, the plurality of perforations in the base plate and in the stripper plate are configured to create alternating regions of needled and non-needled regions along a direction in the fibrous preform placed between the base plate and the stripper plate.

In various embodiments, at least one of the first plurality of perforations or the second plurality of perforations comprises a first zone with a first perforation density, and a second zone with a second perforation density, wherein the first perforation density is higher than the second perforation density, and wherein the perforations in the first zone and the second zone are configured to receive the textile needle.

In various embodiments, the first plurality of perforations and the second plurality of perforations comprise perforated zones alternating with non-perforated zones.

In various embodiments, at least one of the first plurality of perforations or the second plurality of perforations are arranged in a pattern, and wherein the pattern comprises at least one of a rectangular pattern, a hexagonal pattern, a triangular pattern, or a circular pattern.

According to various embodiments, a method for manufacturing a needled fibrous composite preform part is disclosed. The method comprises positioning a plurality of layers of a fibrous preform over a base plate, positioning a stripper plate to conform to the base plate and over the plurality of layers, compressing the plurality of layers between the base plate and the stripper plate, disposing a textile needle through a first perforation disposed in the stripper plate and at least partially into the plurality of layers, to form a needled fibrous preform.

In various embodiments, a method for through thickness needling of a fibrous preform is disclosed and comprises positioning a plurality of layers of a fibrous preform between the base plate and the stripper plate, compressing the plurality of layers between the base plate and the stripper plate, disposing a textile needle through a first perforation disposed in the stripper plate, into the plurality of layers, and at least partially into a corresponding perforation disposed in the base plate to perform a through thickness needling of the fibrous preform.

According to various embodiments, a method for manufacturing a composite part is disclosed. The method comprises positioning a base plate comprising a first plurality of perforations, positioning a first plurality of layers of a fibrous preform over the base plate, positioning a stripper plate comprising a second plurality of perforations over the first plurality of layers, compressing the first plurality of layers between the base plate and the stripper plate, and providing through-thickness reinforcement in the fibrous preform by disposing a textile needle through at least one perforation of at least one of the first plurality of perforations or the second plurality of perforations and at least partially into the fibrous preform.

In various embodiments, the method further comprises moving an expanding joint of the stripper plate to a contracted position to conform to the first plurality of layers, disposing the textile needle through a first perforation disposed in the stripper plate and at least partially into the first plurality of layers, removing the stripper plate from the first plurality of layers, positioning a second plurality of layers of the fibrous preform over the first plurality of layers, positioning the stripper plate over the second plurality of layers, and moving the expanding joint of the stripper plate to an expanded position to conform to the second plurality of layers.

In various embodiments, the method further comprises increasing a thickness of the fibrous preform in response to positioning the second plurality of layers over the first plurality of layers. In various embodiments, the method further comprises disposing the textile needle through the first perforation disposed in the stripper plate, through the second plurality of layers, and at least partially into the first plurality of layers.

In various embodiments, the expanding joint comprises at least one of a tongue and groove joint, interlocking teeth, or a dovetail.

In various embodiments, the method further comprises contracting the expanding joint in response to compressing the fibrous preform.

According to various embodiments, a method for manufacturing a composite preform part, comprising a plurality of layers, is disclosed. The method comprises positioning a fibrous preform with a preform tooling arrangement comprising a base plate and a stripper plate, compressing the fibrous preform between the base plate and the stripper plate, disposing a textile needle through at least one perforation of a plurality of perforations disposed in the stripper plate (or the base plate) and at least partially into the fibrous preform, moving the fibrous preform into a furnace while the fibrous preform remains in the preform tooling arrangement, heating the fibrous preform to a densification temperature while the fibrous preform remains in the preform tooling arrangement, and flowing gases through the perforations and into the fibrous preform to densify the fibrous preform via chemical vapor infiltration.

In various embodiments, the gases are hydrocarbon gases. It should be understood, however, that the same tooling arrangement may be used to flow other reactant gases to deposit other matrices to produce other composite materials—for example methyltrichlorosilane (MTS) or $CH_3Cl_3Si$ for silicon carbide, $BCl_3$ and $NH_3$ for BN, $SiCl_4$ and hydrocarbon for silicon carbide, $SiCl_4$ and ammonia for silicon nitride, $BCl_3$ and hydrocarbon for $B_4C$, and the like including combinations thereof. In addition, inert, diluting, and/or inhibiting gases such as argon, hydrogen and HCl may be combined with the forementioned reactant gases to control deposition rates and morphology of the deposited compounds.

In various embodiments, the method further comprises securing the entire assembly, such that the fibrous preform, the base plate, and the stripper plate remain substantially in the same position relative to one another.

In various embodiments, the gases comprise of hydrocarbons and the densification temperature is in a range from 650° C. to 1425° C. In various embodiments, the densification temperature is in a range from 815° C. to 1040° C.

In various embodiments, the method further comprises flowing the gases through a second perforation disposed in the base plate and into the fibrous preform to deposit carbon from the gases on and within the fibrous preform. In various embodiments the method further comprises aligning the perforations in the base plate and the stripper plate with the needled regions of the fibrous preform to create paths for gases to flow through the fibrous preform.

In various embodiments, the method further comprises heating the fibrous preform to a (carbonization and/or heat-treatment) temperature greater than about 1,000 degrees Celsius.

In various embodiments, the textile needle comprises at least one of a tufting needle or a stitching needle configured to dispose a through thickness reinforcement fibrous filament at least partially through a plurality of layers of the fibrous preform.

In various embodiments, the fibrous filament for through thickness reinforcement comprises at least one of a fiber already disposed in at least one layer of the plurality of layers of the fibrous preform, a carbon fiber, or an oxidized PAN fiber.

In various embodiments, the fibrous filament for through-thickness reinforcement further comprises a fugitive fiber, and the method further comprises heating the reinforced fibrous preform while the fibrous preform remains in the tooling preform arrangement to allow the fugitive fiber to burn away and create channels in the through-thickness direction, and densifying the composite by chemical vapor infiltration by flowing gases through the perforations and into the fibrous preform via the channels in the through thickness direction created by the burning away of fugitive fibers.

In various embodiments, the method further comprises placing a foam layer proximate to the base plate or the stripper plate during the preform needling process. In various embodiments, the method further comprises burning away the foam layer during a chemical vapor infiltration and/or a heat-treatment process.

In various embodiments, the method further comprises biasing the base plate toward the stripper plate with a clamp comprising a first clamp half moveable with respect to a second clamp half, wherein the first clamp half is configured to move toward the second clamp half while the fibrous preform is in the furnace.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 15A, FIG. 15B, FIG. 15C, and FIG. 15D illustrate plate aperture/needling penetration patterns comprising a triangular pattern, a square pattern, a hexagonal pattern, a curvilinear pattern, respectively, in accordance with various embodiments; and FIG. 16A, FIG. 16B, FIG. 16C, FIG. 16D, FIG. 16E, and FIG. 16F illustrate plate aperture/needling penetration zones comprising a triangular pattern, a square pattern, a hexagonal-triangular (star) pattern, and a curvilinear pattern, a hexagonal pattern, and a linear pattern, respectively, in accordance with various embodiments.

DETAILED DESCRIPTION

Figure 1:
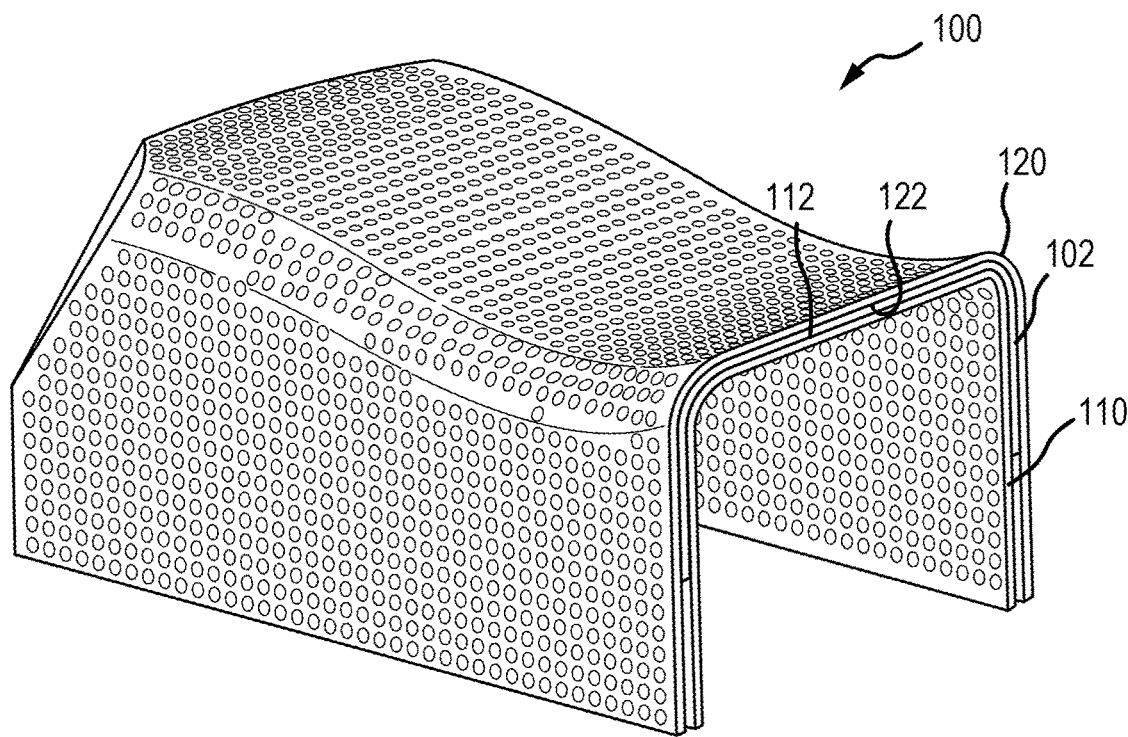
FIG. 1 is a perspective view of a tooling arrangement with a fibrous preform installed between the stripper plate and the base plate, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "fiber volume ratio" means the ratio of the volume of the fibers of the fibrous preform to the total volume of the fibrous preform. For example, a fiber volume ratio of 25% means the volume of the fibers in the fibrous preform is 25% of the total volume of fibrous preform.

As used herein, the term "fiber density" is used with its common technical meaning with units of $g/cm^3$ or g/cc. The fiber density may refer specifically to that of the individual fibers in the fibrous preform. The density will be measured, unless otherwise noted, by taking the weight divided by the geometric volume of each fiber. The density may refer to an average density of a plurality of fibers included in a fibrous preform.

As used herein, "CVI/CVD" may refer to chemical vapor infiltration and/or chemical vapor deposition. Accordingly, CVI/CVD may refer to chemical vapor infiltration or deposition or both.

As used herein, the term "through thickness reinforcement" includes "needling," "stitching," and/or "tufting," in accordance with various embodiments.

As used herein, the term "needling" includes traditional needling, "stitching," and/or "tufting," in accordance with various embodiments.

As used herein, CVI/CVD is described herein, in connection with carbon/carbon composite materials as an example, using hydrocarbon gases as the source of carbon. It should be understood, however, that the tooling arrangement of the present disclosure may be used to flow other reactant gases to deposit carbon and other matrices to produce a variety of composite materials—for example, methyltrichlorosilane may be used to infiltrate the composite with a silicon carbide matrix, $BCl_3$ and ammonia may be used to deposit BN, $SiCl_4$ and hydrocarbon may be used for silicon carbide, $SiCl_4$ and ammonia for silicon nitride, or combinations thereof. In addition, inert gases, diluting gases, and/or inhibiting gases such as argon, hydrogen, and HCl may be combined with these gases to control deposition rates and the morphology of the deposited material.

In various embodiments, the subject matter of this disclosure is generally directed toward fibrous preforms that do not shrink (e.g., carbon fiber); though system and methods of the present disclosure can be utilized with for fibers that exhibit shrinkage, such as OPF, without departing from the scope of the present disclosure.

In general, there are several methods of manufacturing carbon/carbon ("C/C") materials depending on the part geometries and the end application performance requirements. One method involves starting with a dry fibrous preform, forming the preform into a shape by laying up on a tool, fixturing the formed shape into suitable graphite fixtures designed to maintain the formed shape but with perforations for allowing gases to flow, and depositing carbon matrix on the fibers by chemical vapor infiltration (CVI) using suitable reactant gases, pressures, and temperatures to fill the voids between the fibers and densify the part. The chemical vapor infiltration cycles may continue, in conjunction with intermediate machining of the surfaces of the preform between infiltration cycles if desired, until the desired part density is achieved. A second method involves the layup and cure of a fabric comprising of carbon fiber and pre-impregnated with a polymer resin. Process steps for forming a shaped part include the steps of laying-up of several layers of the pre-impregnated fabric onto a tool to form a preform, cure of the fiber-reinforced resin preform to form a rigid shape, pyrolysis of the cured shape to decompose or pyrolyze the resin leaving behind carbon fiber and a matrix comprising of carbon or substantially carbon (>85% by weight of the pyrolyzed resin). In this method, additional polymer resin infiltration and pyrolysis cycles may be employed to increase the amount of carbon matrix in the composites, or until the part achieves the desired density. Other methods, including variations and combinations of the above process methods are also in use and may include variations in preform architecture, infiltration resin type, and chemical vapor infiltration conditions. The subject matter of the present disclosure is particularly suited for methods starting with dry fibrous preforms and employing chemical vapor infiltration, but benefits may be realized for the other methods.

In the foregoing, the fibrous preform comprises a plurality of fabric layers. In various embodiments, the fabric layers comprise a plurality of continuous fiber tows, wherein a fiber tow comprises of a plurality of fiber filaments. These fabric layers may be a weave (e.g., a plain weave, a five harness satin weave, an eight harness satin weave, a basket weave, among others), a braid (e.g., a biaxial braid, a triaxial braid, and the like), and/or a unidirectional tape or fabric layer. The fabric layers may also comprise one or more unidirectional tape or fabric layers wherein each layer is oriented in a different direction relative to the other layer and stitched together to form a stitched non-crimp fabric, as is known in the art. The fibrous preform may further comprise of a fabric layer with discontinuous fibers (e.g., a non-woven fiber mat or veil comprising of discontinuous fibers, chopped fibers and the like). These discontinuous fibers may be randomly oriented or preferentially aligned predominantly in one direction.

The fibrous preform may be shape formed into a net shape, or near net shape, of the final composite part by laying up in a tool fixture or a closed mold, or the like. Before, during, or immediately after (i.e., before any subsequent processing such as consolidation, densification, and/or densification) being shape formed, the fibrous preform may undergo a through thickness reinforcement process (e.g., Z-needling, tufting, and/or stitching).

After a fibrous preform is formed into the shape and undergoes a through-thickness reinforcement, the preform is densified. In general, densification involves filling the voids, or pores, of the fibrous preform with additional carbon material. Typically, chemical vapor infiltration and deposition ("CVI/CVD") techniques are used to densify the porous fibrous preform with a carbon matrix. This commonly involves heating the furnace and the carbon preforms, and flowing hydrocarbon gases into the furnace and around and through the fibrous preforms. As a result, carbon from the hydrocarbon gases separates from the gases and is deposited on and within the fibrous preforms. When the densification step is completed, the resulting C/C part has a carbon fiber structure with a carbon matrix infiltrating the fiber structure, thereby deriving the name "carbon/carbon." In some cases, the fibrous preform may be heat-treated prior to densification and/or after densification. The heat-treatment is intended to stabilize or otherwise modify the microstructure of the fiber and/or the matrix, the bonding between the fiber and matrix, drive out any volatiles or undesirable impurities from the composite, or combinations, thereof. These steps of preforming, through-thickness reinforcement, shape-forming, densification and heat-treatment typically involve moving the fibrous preform between various tools for the different manufacturing steps, which can be cumbersome and time consuming.

C/C parts of the present disclosure may be particularly useful for high temperature aerospace applications. C/C parts of the present disclosure may be especially useful in these applications because of the superior high temperature characteristics of C/C material. In particular, the carbon/carbon material used in C/C parts is a good conductor of heat and is able to dissipate heat generated during high temperature conditions. Carbon/carbon material is also highly resistant to heat damage, and thus, may be capable of sustaining forces during severe conditions without mechanical failure.

FIG. 1 is a perspective illustration, in accordance with various embodiments, of a preform tooling arrangement 100 (also referred to herein as a conformable preform tooling arrangement). Tooling arrangement 100 includes a base plate 110 and a stripper plate 120. Base plate 110 may define a male die surface 112 for receiving a fibrous preform 102. Male die surface 112 may be a convex surface. Stripper plate 120 may define a female die surface 122 for receiving fibrous preform 102. Female die surface 122 may be a concave surface. In this manner, fibrous preform 102 may conform to a size and geometry of the male die surface 112 and female die surface 122. FIG. 1 illustrates fibrous preform 102 installed between male die surface 112 and female die surface 122. Base plate 110 and stripper plate 120 may be made from a metallic material, a graphite material, a C/C composite material, and/or a ceramic matrix composite material, e.g., SiC/SiC material among others.

During a near net shape lay-up process, one or more sheets or layers of material (e.g., carbon fiber in various embodiments) may be laid up over base plate 110 to form fibrous preform 102. Stripper plate 120 may be placed over base plate 110 to compress the fibrous preform 102 therebetween.

Figure 2:
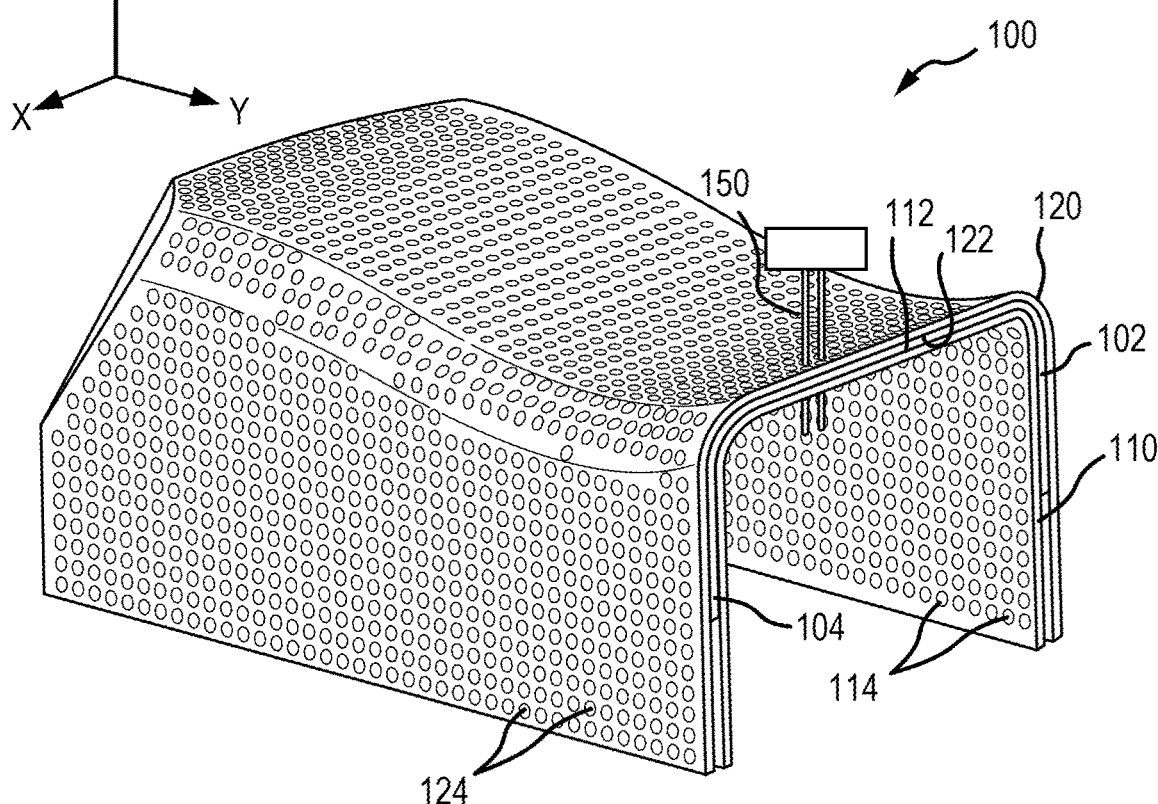
FIG. 2 is a perspective view of the tooling arrangement of FIG. 1 during a z-needling process, in accordance with various embodiments.

FIG. 2 illustrates, in accordance with various embodiments, the tooling arrangement 100 during a needling process. Fibrous preform 102 may undergo a needling process after, or during, the near net shape lay-up process while fibrous preform 102 remains in the same fixture (i.e., between base plate 110 and stripper plate 120). Stated differently, tooling arrangement 100 may accommodate both near net shape lay-up and needling processes. In this regard, base plate 110 comprises a plurality of perforations 114 (also referred to herein as a first plurality of perforations). Stripper plate 120 similarly comprises a plurality of perforations 124 (also referred to herein as a second plurality of perforations). Perforations 114 and perforations 124 may be configured to align such that the center axis of each perforation 114 aligns with the center axis of a corresponding perforation 124; though in various embodiments perforations 114 do not align with perforations 124. In this manner, perforations 114 and perforations 124 may align such that each perforation can receive a needle 150 therethrough during the needling process. In this regard, perforations 114 and/or perforations 124 may be sized to receive a textile needle 150.

Figure 14:
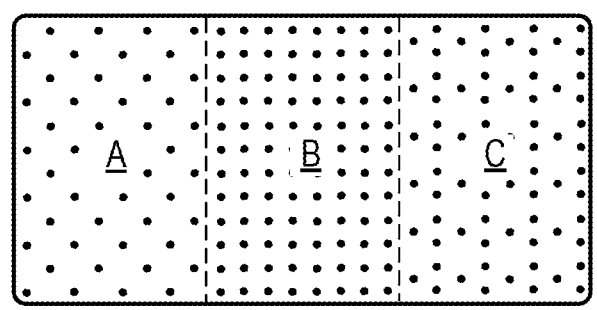
FIG. 14 illustrates a schematic view of a plate (i.e., a base plate and/or a stripper plate) with zones of the plate having perforations disposed at different densities, in accordance with various embodiments.

In various embodiments, the plurality of perforations in the base plate 110 and stripper plate 120 are configured to generate a plurality of perforation zones with different perforation densities, or number of perforations per unit area. For example, momentary reference to FIG. 14, perforations 114 and/or perforations 124 may generate a first zone A comprising a first density, a second zone B comprising a second density different from that of zone A, and/or a third zone C comprising a third density different from that of zone A and zone B. In various embodiments, perforation density can be greater in some areas to allow for increased needle density (through-thickness reinforcement) in order to increase the interlaminar strength of fibrous preform so as to handle an expected increased interlaminar stress on the final part.

In various embodiments, the plurality of perforations in the base plate 110 and stripper plate 120 are configured to generate a plurality of patterns, e.g., a rectangular pattern, a hexagonal pattern, a triangular pattern, a circular pattern, among others. For example, with momentary reference to FIG. 15A through FIG. 15D, needling penetration patterns may be selected from various shapes at various locations of the fibrous preform, for example depending on the desired through thickness reinforcement and the expected interlaminar stress. FIG. 15A through FIG. 15D illustrate plates 410 (i.e., base plate 110 and/or stripper plate 120) with apertures 440 (each representing a single needle punch). Needling penetrations patterns (i.e., the arrangement of apertures 440) can comprise a triangular pattern (see FIG. 15A), a square pattern (see FIG. 15B), a hexagonal pattern (see FIG. 15C), and/or a curvilinear pattern (see FIG. 15D).

With reference to FIG. 16A through FIG. 16F, needling penetration zones may be selected from various shapes at various locations of the fibrous preform depending on the desired through thickness reinforcement and the expected interlaminar stress. FIG. 16A through FIG. 16F illustrate plates 510 (i.e., base plate 110 and/or stripper plate 120) with black areas 442 representing a non-perforated zone (e.g., a non-needled zone) and white areas 444 representing a perforated zone (e.g., a needled zone). In this regard, a first perforated zone may be spaced apart from a second perforated zone, wherein a non-perforated zone is disposed therebetween. Stated differently, perforations in the base plate 110 and/or the stripper plate 120 may form perforated zones alternating with non-perforated zones along the surface of the base plate 110 and/or the stripper plate 120 (e.g., along a direction perpendicular to a center axis of the perforations). Perforation zones (i.e., the areas where the fibrous preform is needled) can comprise a plurality of triangular patterns (see FIG. 16A), a plurality of square patterns (see FIG. 16B), a plurality of hexagonal-triangular patterns (see FIG. 16C), a plurality of curvilinear patterns (see FIG. 16D), a matrix of hexagonal patterns (see FIG. 16E), and/or a plurality of linear patterns (see FIG. 16F). In this regard, the plurality of perforations in the base plate 110 and the plurality of perforations in the stripper plate 120 may be configured to create alternating regions of needled and non-needled regions along a direction in the fibrous preform 102 placed between the base plate 110 and the stripper plate 120, in accordance with various embodiments.

With reference to FIG. 2, the layers of the fibrous preform 102 may be needled perpendicularly to each other (i.e., along the Z-direction) with barbed, textile needles or barbless, structuring needles. In various embodiments, the layers are needled at an angle of between 0° and 60° (e.g., 0°, 30°, 45°, and/or 60°) with respect to the Z-direction to each other. The needling process generates a series of z-fibers through fibrous preform 102 that extend perpendicularly to the fibrous layers. The z-fibers are generated through the action of the needles 150 pushing fibers from within the layer (x-y or in-plane) and reorienting them in the z-direction (through-thickness). Needling of the fibrous preform may be done as one or more layers are added to the stack or may be done after the entire stack of layers is formed. The needles 150 may also penetrate through only a portion of fibrous preform 102, or may penetrate through the entire fibrous preform 102. In addition, resins are sometimes added to fibrous preform 102 by either injecting the resin into the preform following construction or coating the fibers or layers prior to forming the fibrous preform 102. The needling process may take into account needling parameters optimized to maintain fiber orientation, minimize in-plane fiber damage, and maintain target interlaminar properties. It should be understood that the Z-direction in FIG. 2 corresponds to the location of needles 150. It should be understood however that the Z-direction is meant to correspond to the direction perpendicular to the plane of the fibrous preform 102 at the location the fibrous preform 102 is being needled. For example, the Z-direction at the sidewall 104 of the fibrous preform 102 would be the direction labeled as the X-direction in FIG. 2. It should also be understood that the Z-direction may be at an angle to the plane of the fibrous preform 102 at the location the fibrous preform 102 is being needled, and the perforations in the base plate 110 and the stripper plate(s) 120 may be configured to receive the needle at such angle.

Figure 3:
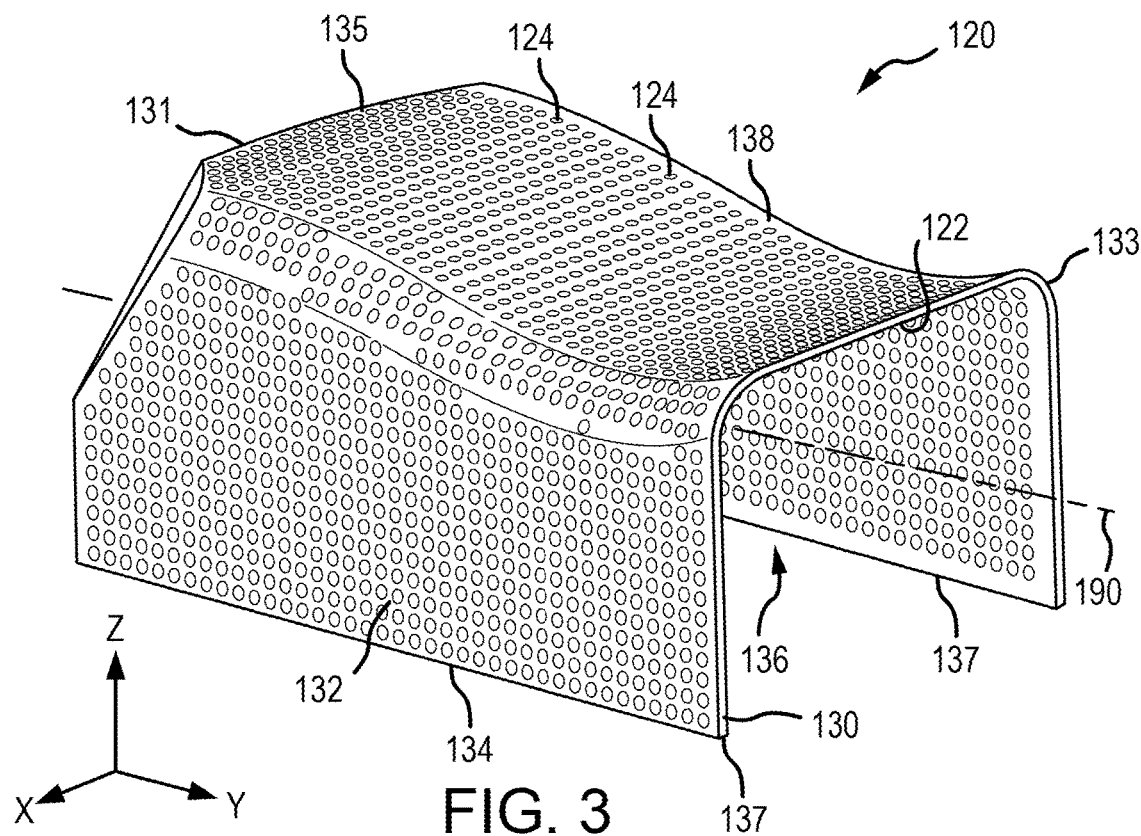
FIG. 3 is a perspective view of the stripper plate of the tooling arrangement of FIG. 1, in accordance with various embodiments.

FIG. 3 illustrates, in accordance with various embodiments, a perspective view of the stripper plate 120. Stripper plate 120 extends longitudinally along a longitudinal centerline 190 of the stripper plate 120 (e.g., along a Y-axis) between and to a first end 130 of the stripper plate 120 and a second end 131 of the stripper plate 120. The stripper plate 120 extends laterally (e.g., along an X-axis) between and to a first side 132 of the stripper plate 120 and a second side 133 of the stripper plate 120. The stripper plate 120 extends vertically (e.g., along a Z-axis) between and to a bottom side 134 of the stripper plate 120 and a top side 135 of the stripper plate 120.

The stripper plate 120 is configured with at least one die recess 136; e.g., an aperture such as a pocket, a channel, a groove, etc. The die recess 136 of FIG. 3 extends (e.g., partially) vertically into the stripper plate 120 from one or more bottom surfaces 137 of the stripper plate 120 to female die surface 122 of the stripper plate 120, where the bottom surfaces 137 of FIG. 3 are arranged on opposing sides of the female die surface 122 at the bottom side 134. The die recess 136 of FIG. 3 extends longitudinally in (e.g., through) the stripper plate 120, for example, between and to the stripper plate first end 130 and/or the stripper plate second end 131. The die recess 136 of FIG. 3 extends laterally in (e.g., within) the stripper plate 120, for example, between opposing lateral sides of the female die surface 122.

The female die surface 122 is a concave or concave-convex surface and may have a curved geometry; e.g., a three-dimensional (3D) curvature. The female die surface 122 of FIG. 3, for example, has a curved (e.g., arcuate, splined, etc.) cross-sectional geometry in a lateral-vertical reference plane; e.g., an X-Z plane. The female die surface 122 may also have a curved (e.g., arcuate, splined, etc.) cross-sectional geometry in a longitudinal-vertical reference plane; e.g., a Y-Z plane. This recess curvature may change as the female die surface 122/the die recess 136 extends laterally and/or longitudinally, which may provide the female die surface 122 with a complex 3D curvature. In various embodiments, the recess curvature may remain uniform as the female die surface 122/the die recess 136 extends laterally and/or longitudinally. The female die surface 122 may be configured without any sharp corners or sharp transitions.

Stripper plate 120 further comprises an outer surface 138. In various embodiments, outer surface 138 generally follows the contour of female die surface 122 such that a wall thickness of stripper plate 120 (i.e., the shortest distance from female die surface 122 to outer surface 138 at any particular location) is generally uniform throughout the stripper plate 120, though in various embodiments the wall thickness of stripper plate 120 may vary. Perforations 124 extend between and to female die surface 122 and outer surface 138 of stripper plate 120.

Perforations 114 and/or perforations 124 may comprise round holes of between 0.05 inch and 0.75 inch (1.27 mm-19.05 mm) in diameter. Perforations 114 and/or perforations 124 may cover 50-99% of the base plate 110 and/or stripper plate 120, respectively. Perforations 114 and/or perforations 124 may be spaced 0.075 inch to 1 inch (1.905 mm-25.4 mm) apart center-to-center, as measured either horizontally, vertically, or diagonally, depending on the location of the perforations 114 being measured. In various embodiments, perforations 114 and/or perforations 123 may constitute 20%-75% of the total surface area of the base plate 110 and/or stripper plate 120, respectively.

In various embodiments, stripper plate 120 is a single piece component; though stripper plate 120 may also be formed as a two or more piece component (see FIG. 7A through FIG. 8G).

Figure 4:
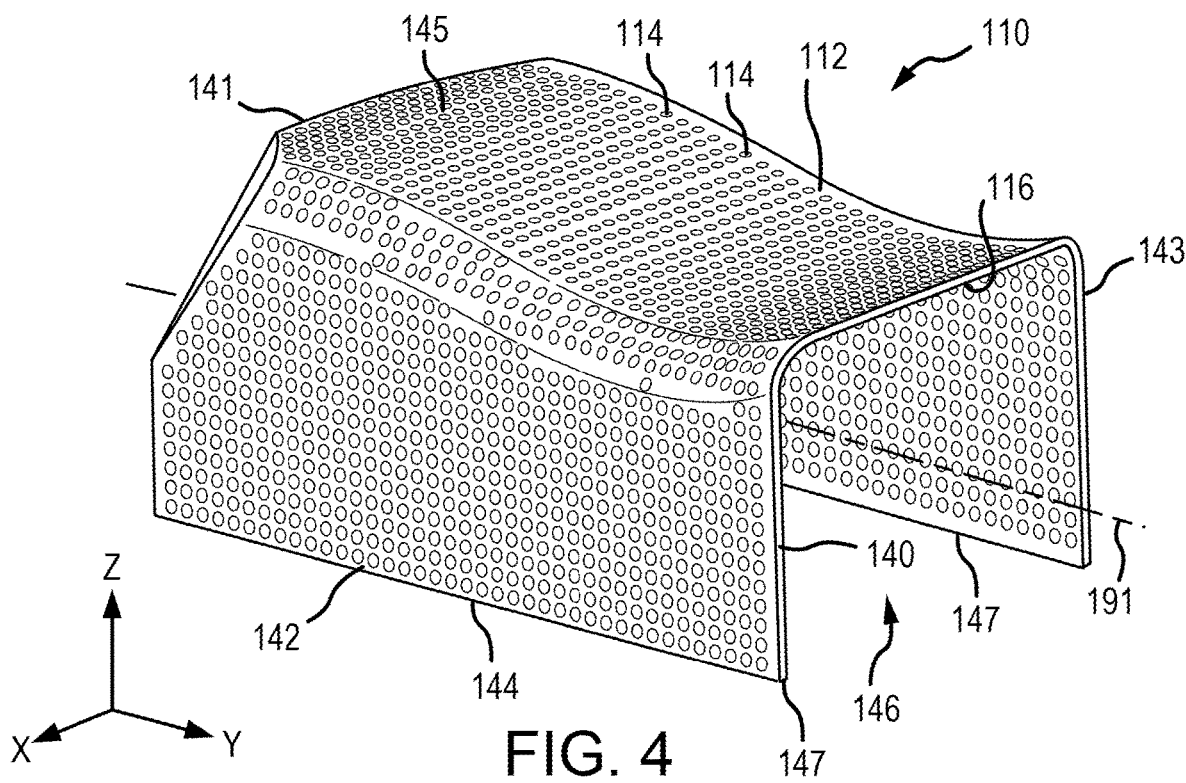
FIG. 4 is a perspective view of the base plate of the tooling arrangement of FIG. 1, in accordance with various embodiments.

FIG. 4 illustrates, in accordance with various embodiments, a perspective view of the base plate 110. Base plate 110 extends longitudinally along a longitudinal centerline 191 of the base plate 110 (e.g., along a Y-axis) between and to a first end 140 of the base plate 110 and a second end 141 of the base plate 110. The base plate 110 extends laterally (e.g., along an X-axis) between and to a first side 142 of the base plate 110 and a second side 143 of the base plate 110. The base plate 110 extends vertically (e.g., along a Z-axis) between and to a bottom side 144 of the base plate 110 and a top side 145 of the base plate 110.

The base plate 110 may be configured with at least one recess 146; e.g., an aperture such as a pocket, a channel, a groove, etc. The recess 146 of FIG. 4 extends (e.g., partially) vertically into the base plate 110 from one or more bottom surfaces 147 of the base plate 110 to a recess surface 116 of the base plate 110, where the bottom surfaces 147 of FIG. 4 are arranged on opposing sides of the recess surface 116 at the bottom side 144. The recess 146 of FIG. 4 extends longitudinally in (e.g., through) the base plate 110, for example, between and to the base plate first end 140 and/or the base plate second end 141. The recess 146 of FIG. 4 extends laterally in (e.g., within) the base plate 110, for example, between opposing lateral sides of the recess surface 116.

The male die surface 112 is a convex or concave-convex surface and may have a curved geometry; e.g., a three-dimensional (3D) curvature. The male die surface 112 of FIG. 4, for example, has a curved (e.g., arcuate, splined, etc.) cross-sectional geometry in a lateral-vertical reference plane; e.g., an X-Z plane. The male die surface 112 may also have a curved (e.g., arcuate, splined, etc.) cross-sectional geometry in a longitudinal-vertical reference plane; e.g., a Y-Z plane. This recess curvature may change as the male die surface 112/the recess 146 extends laterally and/or longitudinally, which may provide the male die surface 112 with a complex 3D curvature. In embodiments, the recess curvature may remain uniform as the male die surface 112/the recess 146 extends laterally and/or longitudinally. The male die surface 112 may be configured without any sharp corners or sharp transitions.

In various embodiments, recess surface 116 generally follows the contour of male die surface 112 such that a wall thickness of base plate 110 (i.e., the shortest distance from recess surface 116 to male die surface 112 at any particular location) is generally uniform throughout the base plate 110, though in various embodiments the wall thickness of base plate 110 may vary. Perforations 114 extend between and to male die surface 112 and recess surface 116 of base plate 110.

In various embodiments, base plate 110 is a single piece component; though base plate 110 may also be formed as a two or more piece component (see FIG. 7A through FIG. 8G). For example, with momentary reference to FIG. 8A through FIG. 8G) base plate 110 can comprise two or more pieces (e.g., first half 211 and second half 212) moveable with respect to one another to conform to the shape and/or size of the fibrous preform 102 and/or support structure 105. It should be understood that although illustrated as having a first half 211 and a second half 212, base plate 110 can comprise any number of base plate sub-components that are configured together to define a male die surface 112 (see FIG. 6). Moreover, it is contemplated herein that the male die sub-components can interlock with one another similar to the stripper plate sub-components 281, 282, as described herein.

Figure 5:
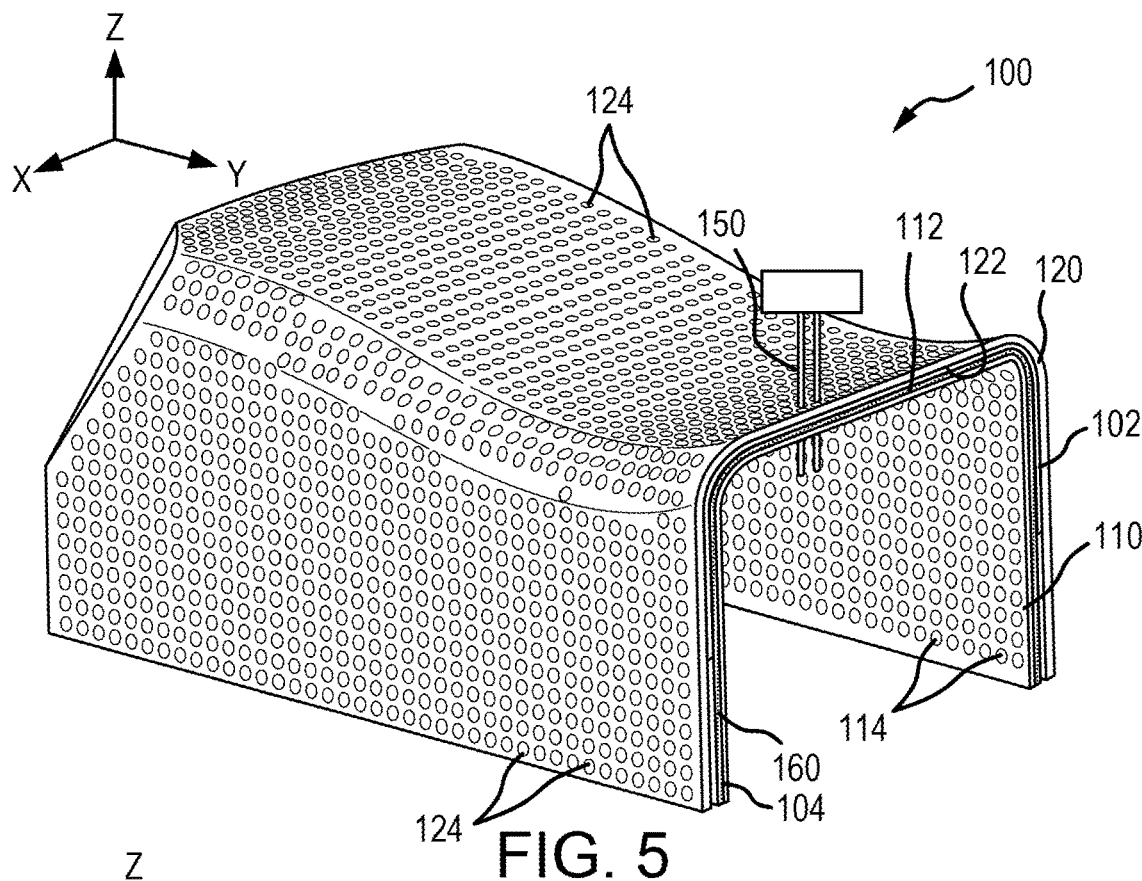
FIG. 5 is a perspective view of the tooling arrangement of FIG. 2 and further including a foam backing layer, in accordance with various embodiments.

FIG. 5 illustrates, in accordance with various embodiments, tooling arrangement 100 further including a foam backing layer 160 disposed between fibrous preform 102 and base plate 110. Foam backing layer 160 may be thick enough such that the needles 150 penetrate only into the foam backing layer 160 and not into the base plate 110. This arrangement tends to allow for more flexibility in base plate 110 design, as the perforations 114 do not need to be aligned with the needling operation. In various embodiments, foam backing layer 160 provides structural support for the fibrous preform 102 during the z-needling process.

Figure 6:
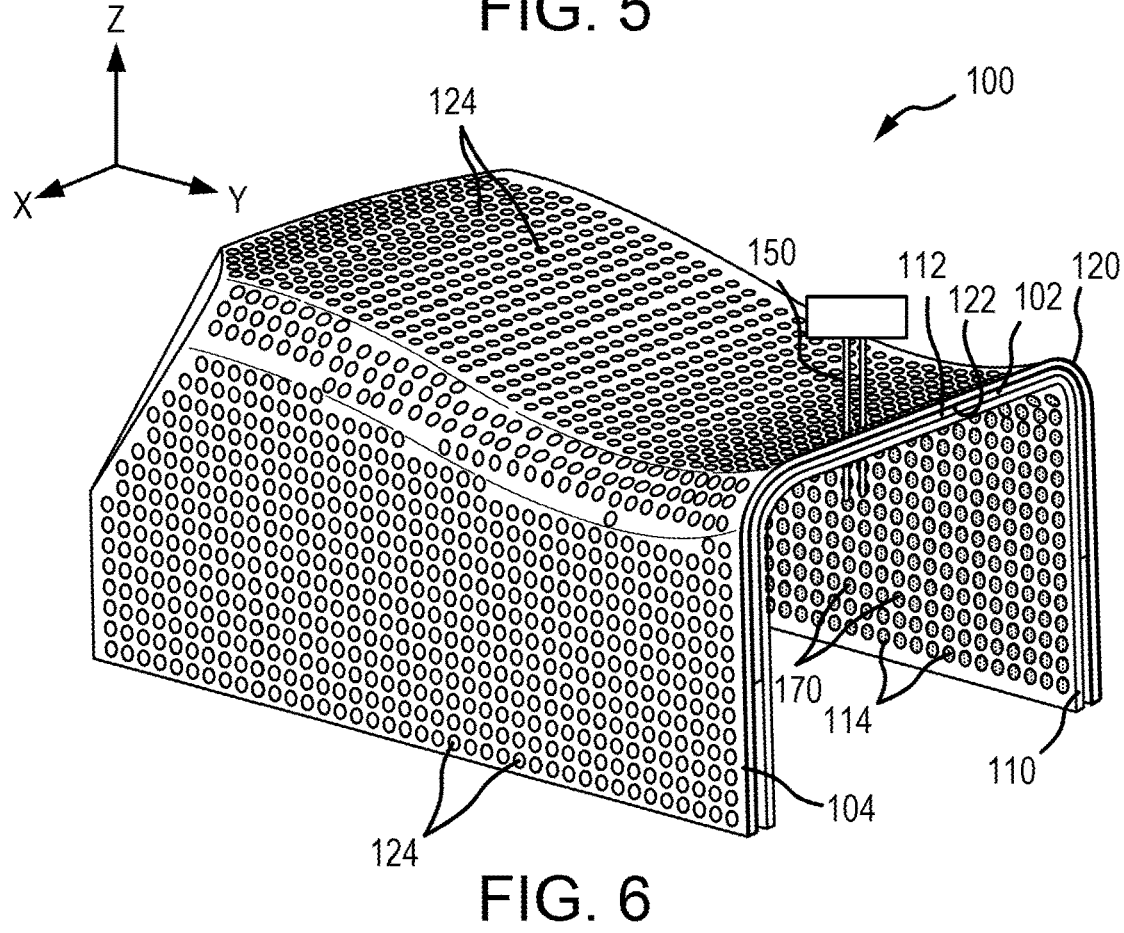
FIG. 6 is a perspective view of the tooling arrangement of FIG. 2 and further including a foam infill layer, in accordance with various embodiments.

FIG. 6 illustrates, in accordance with various embodiments, tooling arrangement 100 further including a foam infill layer 170 disposed in the perforations 114 of base plate 110. In this manner, the needles 150 may penetrate through the foam infill layer 170. Providing foam infill layer 170 in perforations 114 tends to allow for more flexibility in base plate 110 design. Providing foam infill layer 170 in perforations 114 tends to aid in keeping needle orientation aligned (i.e., to keep the needles 150 from deflecting). For example, perforations 114 in base plate 110 can be larger for CVI densification while still supporting the needling operation. In various embodiments, foam infill layer 170 provides structural support for the fibrous preform 102 during the z-needling process.

Figure 7A:
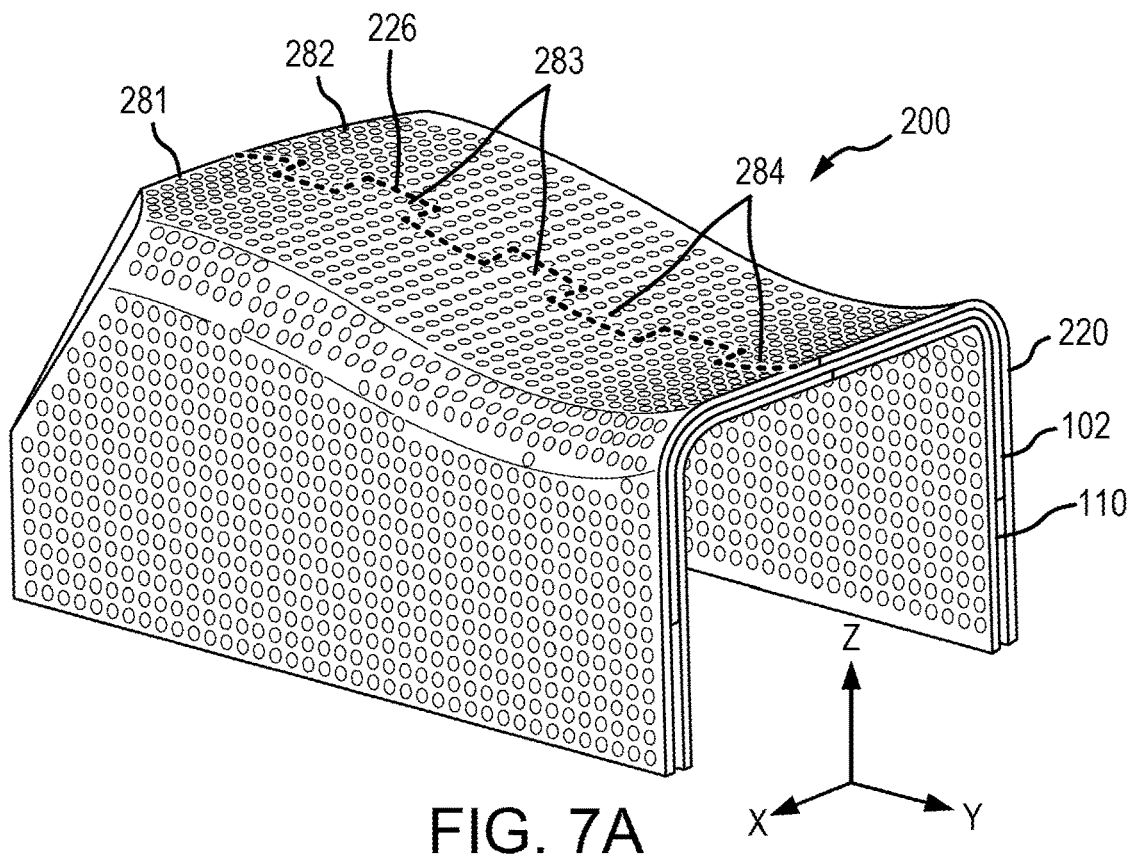
FIG. 7A is a perspective view of a conformable tooling arrangement with a fibrous preform installed between the stripper plate and the base plate, in accordance with various embodiments.

FIG. 7A illustrates, in accordance with various embodiments, a conformable tooling arrangement 200. Tooling arrangement 200 may be similar to tooling arrangement 100, except that stripper plate 220 includes flexible joints 226 such that the stripper plate 220 may expand and conform to the shape of the fibrous preform 102 as layers are added to the fibrous preform 102. Equipping stripper plate 220 with flexible joints 226 tends to ensure compression is appropriately applied to the fibrous preform 102 at each stage of manufacturing.

In various embodiments, stripper plate 220 can comprise two or more pieces (e.g., first half 281 and second half 282) moveable with respect to one another to conform to the shape and/or size of the fibrous preform 102. It should be understood that although illustrated as having a first half 281 and a second half 282, stripper plate 220 can comprise any number of stripper plate sub-components that are configured together to define a female die surface 122 (see FIG. 6). In various embodiments, first half 281 comprises a first plurality of interlocking teeth 283 and second half comprises a second plurality of interlocking teeth 284. First plurality of interlocking teeth 283 may be configured to interlock with second plurality of interlocking teeth 284. In various embodiments, first plurality of interlocking teeth 283 interlock with second plurality of interlocking teeth 284 to lock the first half 281 from sliding longitudinally with respect to second half 282.

In various embodiments, the flexible joint 226 may be selected from a variety of joints—tongue and groove, interlocking teeth, dovetail, etc. In various embodiments, the flexible joint 226 comprises a tongue and groove connection between a first half 281 of the stripper plate 220 and a second half 282 of the stripper plate 220. The tongue and groove connection can be utilized to mitigate out of plane (e.g., the vertical direction or along the Z-direction) movement of the first half 281 with respect to the second half 282.

In various embodiments, flexible joint 226 comprises a dovetail connection. The dovetail connection may lock the first half 281 from sliding laterally (along the X-direction) with respect to the second half 282. In this manner, first half 281 and/or second half 282 may be replaced with different sized halves to accommodate different sized preforms 102.

Figure 7B:
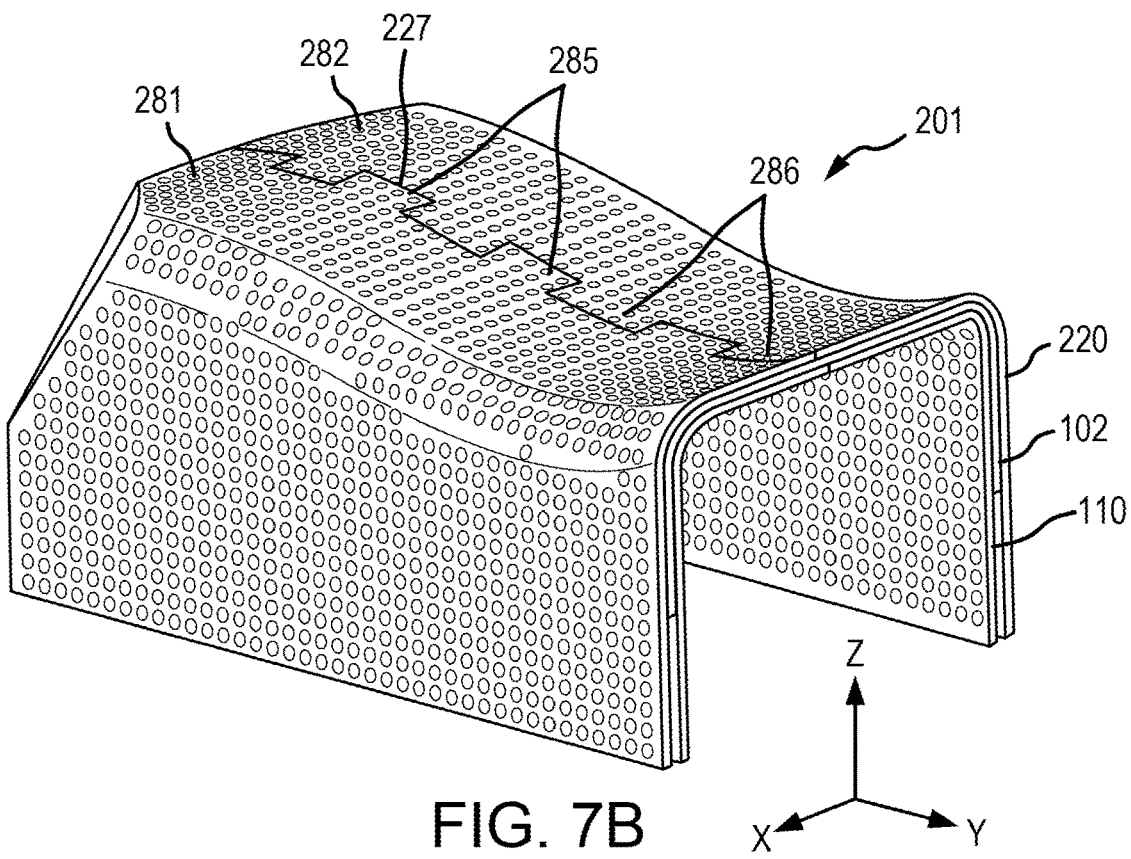
FIG. 7B is a perspective view of a conformable tooling arrangement with a fibrous preform installed between the stripper plate and the base plate, in accordance with various embodiments.

FIG. 7B illustrates, in accordance with various embodiments, a conformable tooling arrangement 201. Conformable tooling arrangement 201 may be similar to conformable tooling arrangement 200. Flexible joint 227 comprises interlocking teeth whereby the first half 281 is slidably coupled to second half 282. For example, the first plurality of interlocking teeth 285 and the second plurality of interlocking teeth 286 may lock the first and second halves 281, 282 from sliding longitudinally (along the Y-direction) with respect to one another, but may allow the first and second halves 281, 282 to freely slide laterally (along the X-direction) with respect to one another.

For example, FIG. 8A through FIG. 8G illustrates a C/C part manufacturing process using conformable tooling arrangement 201.

Figure 8A:
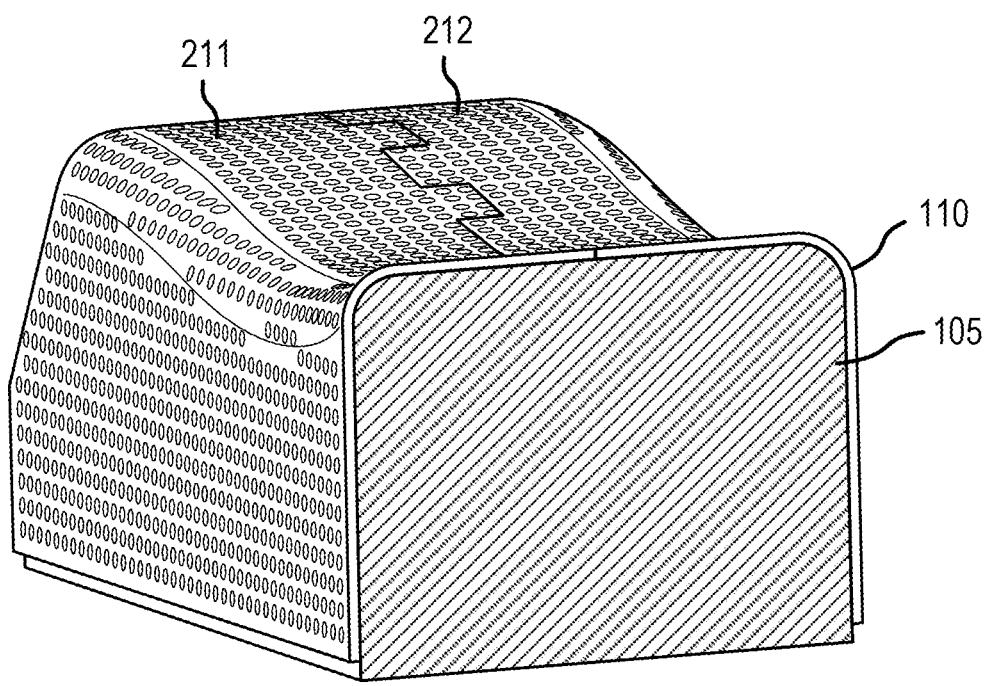
FIG. 8A, FIG. 8B, FIG. 8C, FIG. 8D, FIG. 8E, FIG. 8F, and FIG. 8G, illustrate manufacturing steps using the conformable tooling arrangement of FIG. 7A, in accordance with various embodiments.

With reference to FIG. 8A, the base plate 110 may be placed onto a mount or support structure 105.

Figure 8B:
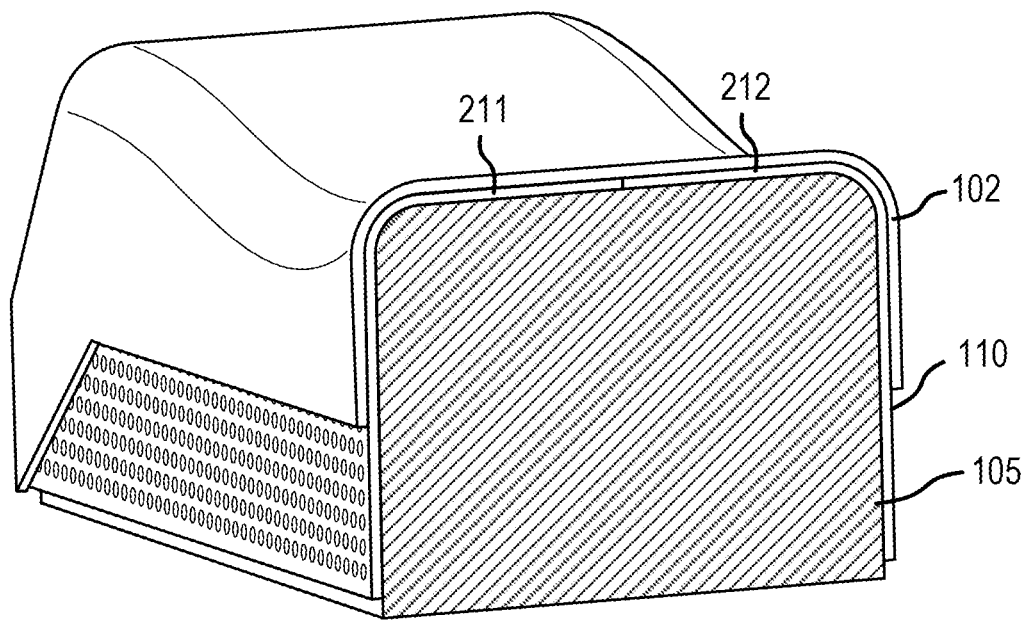

With reference to FIG. 8B, the fibrous preform 102 is placed on the base plate 110. In various embodiments, a first layer of the fibrous preform 102 is placed on the base plate 110 in FIG. 8B. The fibrous preform 102 can conform to a shape of the base plate 110.

Figure 8C:
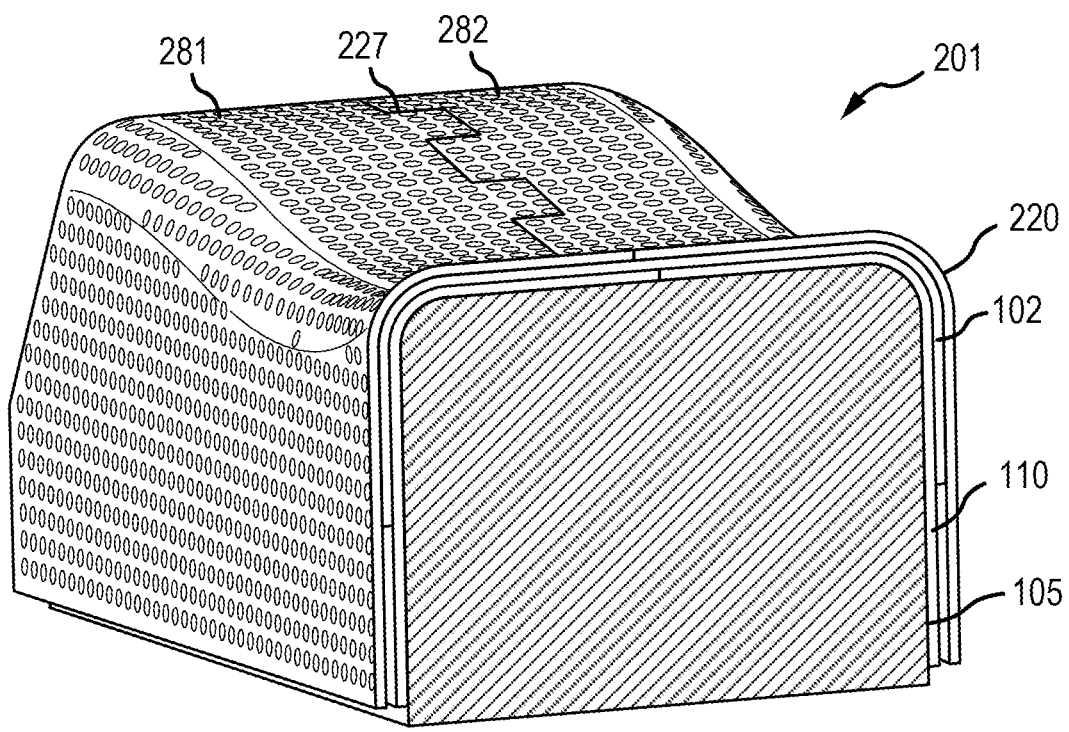

With reference to FIG. 8C, the stripper plate 220 is placed on top of the fibrous preform 102. In various embodiments, first half 281 is placed over fibrous preform 102 and second half 282 is placed over fibrous preform 102. In FIG. 8C, the flexible joint 227 is moved to a contracted position, whereby the flexible joint 227 is closed or nearly closed (i.e., the first half 281 is moved against, or close to, the second half 282).

Figure 8D:
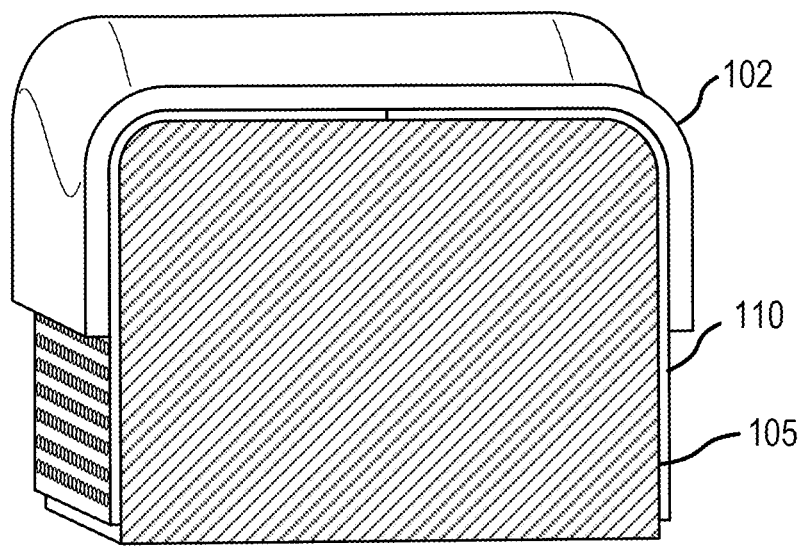

With reference to FIG. 8D, the stripper plate 220 can be removed and additional plies or layers can be added to the fibrous preform 102. In this regard, the overall size of fibrous preform 102 can increase.

Figure 8E:
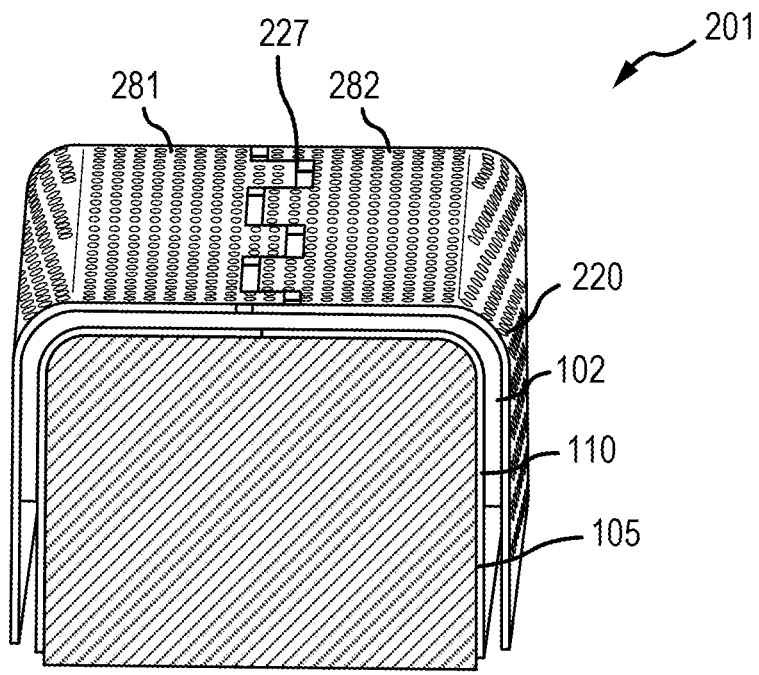

With reference to FIG. 8E, the stripper plate 220 can again be placed over the fibrous preform 102, though this time the first half 281 may be further spaced apart from the second half 282 due to the increased volume of the fibrous preform 102. Although the flexible joint 227 is illustrated at a central location of the stripper plate 220, flexible joint 227 may additionally or alternatively be placed at the corners (e.g., radii) of the stripper plate 220. In various embodiments, the fibrous preform 102 is compressed between the base plate 110 and the stripper plate 220. In various embodiments, the additional plies or layers can be successively needled each time a new layer is added, as desired (see FIG. 2). FIG. 8E illustrates the flexible joint 227 of the stripper plate 220 moved to an expanded position to conform to the plurality of layers of the fibrous preform 102. In the expanded position, the first half 281 is moved away (e.g., laterally) from the second half 282 to accommodate the increased thickness of the fibrous preform 102.

Figure 8F:
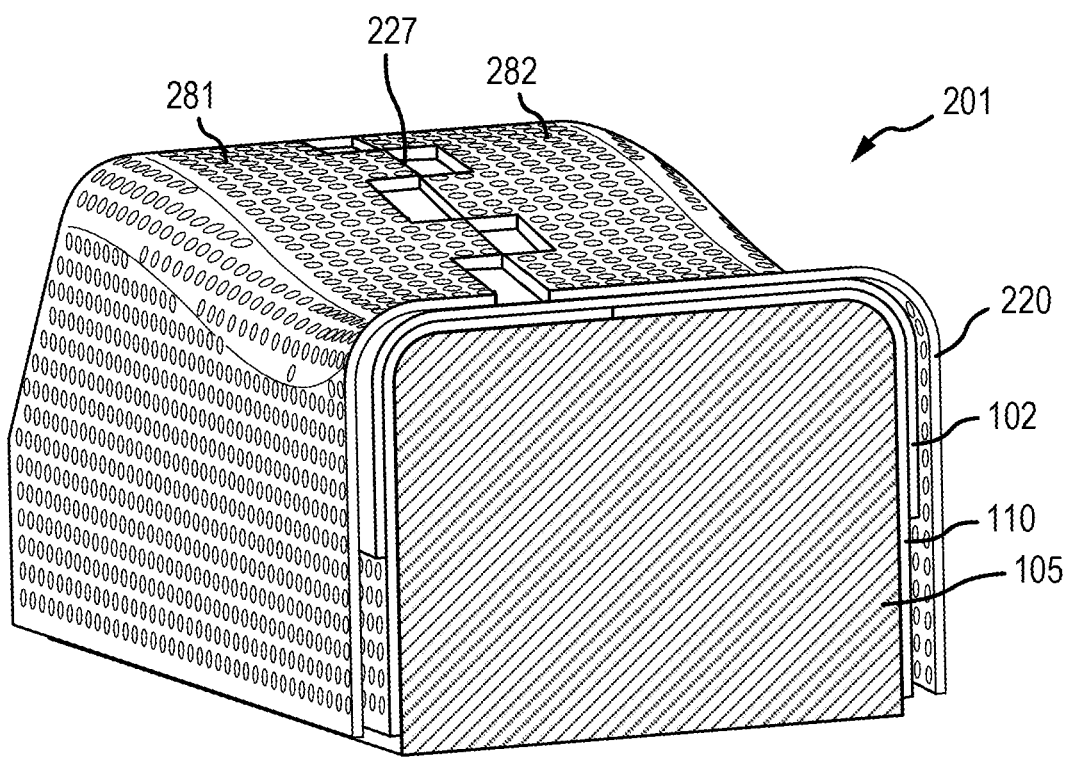

With reference to FIG. 8F, the steps described with respect to FIG. 8B through FIG. 8E may be repeated as desired, using the flexible joint 227 in stripper plate 220 to adjust to different thicknesses of the fibrous preform 102.

Figure 8G:
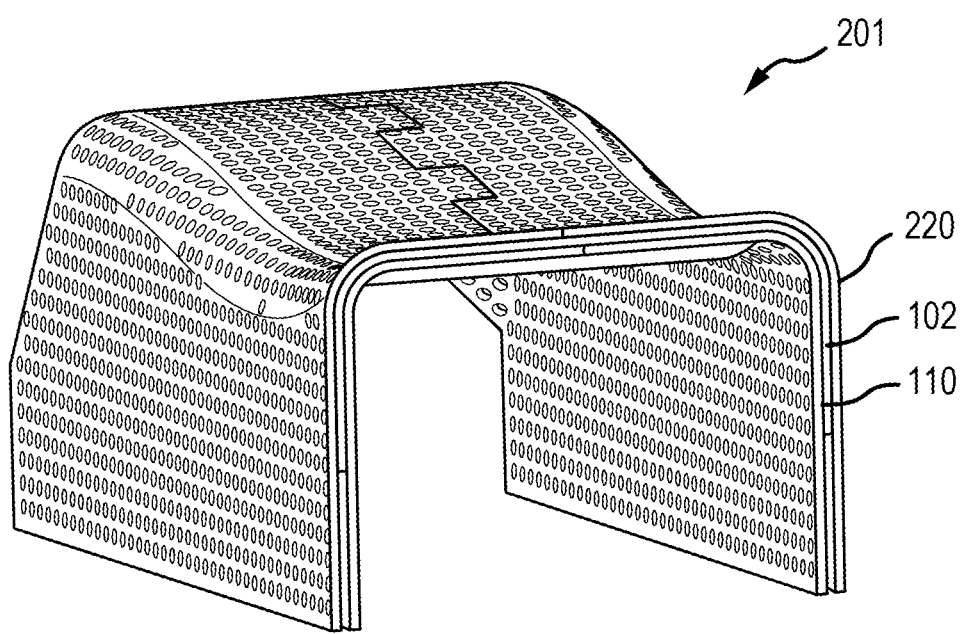
Figure 10:
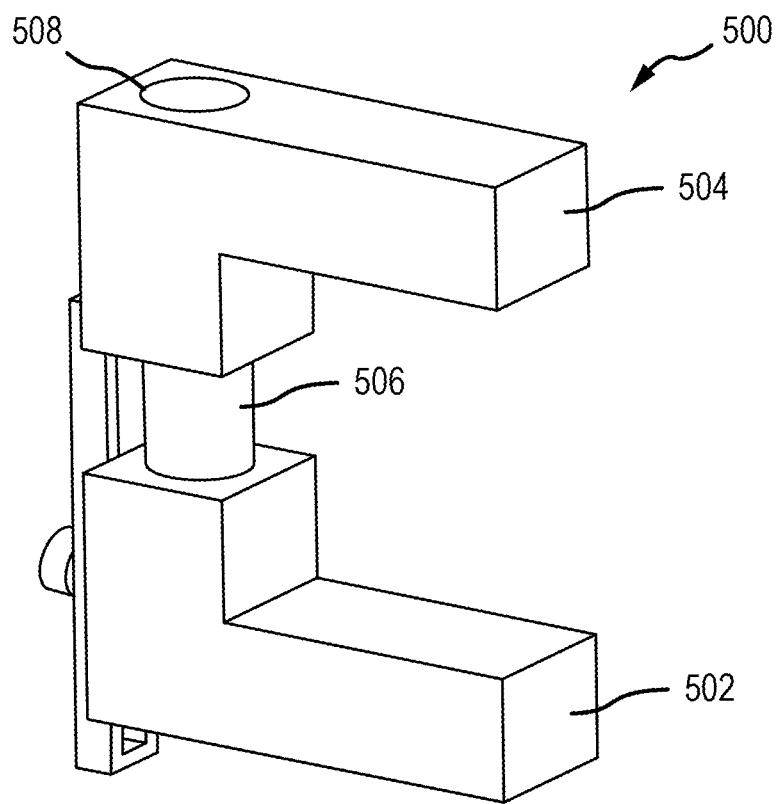
FIG. 10 is a perspective view of a composite clamp, in accordance with various embodiments.

With reference to FIG. 8G, the conformable tooling arrangement 201, together with fibrous preform 102, can be loaded into a furnace for densification as desired. In various embodiments, a composite clamp 500 (see FIG. 10 and FIG. 11) can be installed over the base plate 110 and stripper plate 220 before placing the conformable tooling arrangement 201 into the furnace.

Figure 9:
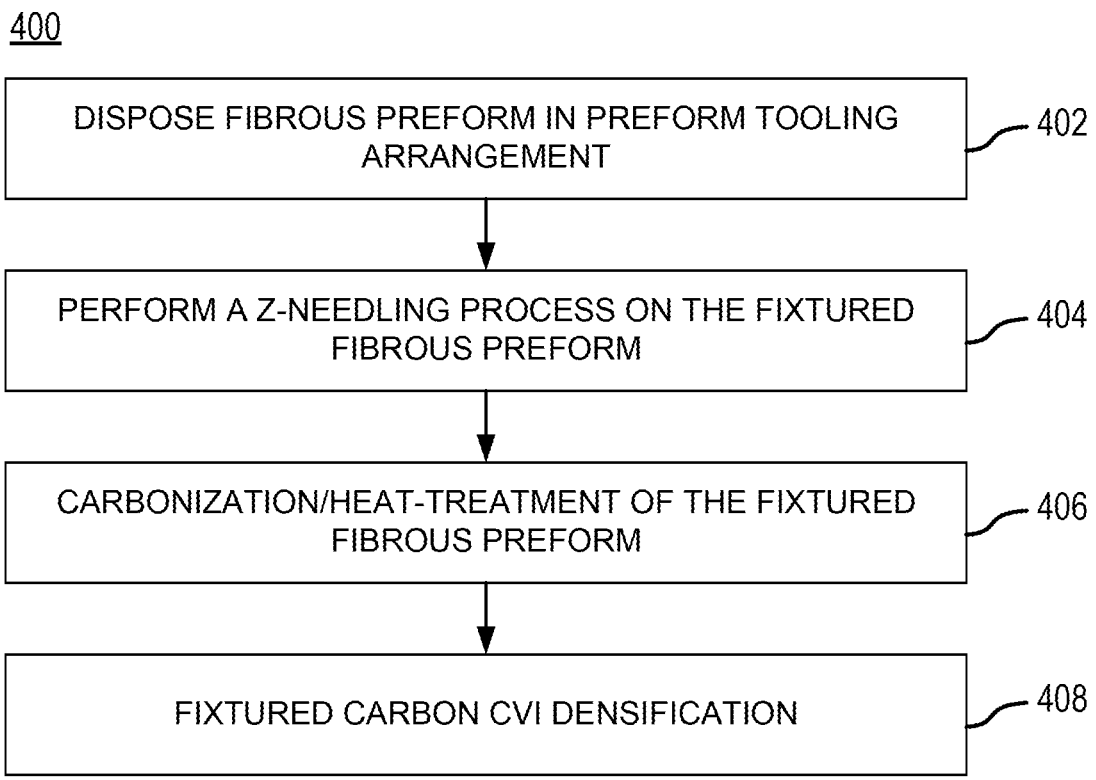
FIG. 9 illustrates a flow chart for a method for manufacturing a composite part made from a multi-layer fibrous preform, in accordance with various embodiments.

FIG. 9 is a flow chart for a method 400 for manufacturing a carbon-carbon component, in accordance with various embodiments. For ease of description, the method 400 is described below with reference to FIG. 1 through FIG. 6. The method 400 of the present disclosure, however, is not limited to use of the exemplary preform tooling arrangement 100 of FIG. 1 through FIG. 6.

In step 402, the fibrous preform 102 is provided. Fibrous preform 102 may be configured as a multi-layered preform. Fibrous preform 102 may be draped over base plate 110, for example when fibrous preform 102 is made from one or more layers of carbon fiber sheets. Fibrous preform 102 may be placed over base plate 110 and compressed into the desired shape and fiber volume (e.g., using stripper plate 120, for example when fibrous preform 102 is made from one or more layers of fabrics or sheets. The stripper plate 120 may be placed over the fibrous preform 102 to compress the fibrous preform 102 between the stripper plate 120 and the base plate 110 (see FIG. 1 for example).

In step 404, a the fibrous preform 102 undergoes a z-needling process in situ (i.e., while the fibrous preform 102 is installed between the stripper plate 120 and the base plate 110). In various embodiments, and in preparation for the z-needling process, foam backing layer 160 disposed between fibrous preform 102 and base plate 110 (see FIG. 5) or foam infill layer 170 is disposed in the perforations 114 of base plate 110 (see FIG. 6). During the z-needling process, textile needles 150 are inserted through perforations 124 and at least partially into fibrous preform 102 to displace fibers in fibrous preform 102 to extend in the z-direction, thereby achieving desired interlaminar properties of the fibrous preform 102. In various embodiments, during the z-needling process, textile needles 150 are inserted through perforations 124 and completely through fibrous preform 102. In various embodiments, during the z-needling process, textile needles 150 are inserted through perforations 124, completely through fibrous preform 102, and at least partially into foam backing layer 160. In various embodiments, during the z-needling process, textile needles 150 are inserted through perforations 124, completely through fibrous preform 102, and at least partially into foam infill layer 170. In various embodiments, during the z-needling process, textile needles 150 are inserted through both perforations 124 and perforations 114 (e.g., in embodiments where perforations 114 and perforations 124 are aligned).

In various embodiments, a sizing agent is added to the fibrous preform 102 during the shape-forming process. For example, a sizing agent comprising a fluid and/or fluid vapor such as water, steam, and/or polyvinyl alcohol may be applied to the fibrous preform 102 (e.g., before being shape formed). Adding the sizing agent to the fibrous preform 102 may dampen the fibers thereof which tends to relax the fibers of the fibrous preform, thereby aiding in the bending, forming, and/or stretching of the fibrous preform. Adding the sizing agent to the fibrous preform 102 may also help to reduce wrinkling of the fibrous preform. Sizing may help to protect the fiber from handling damage and provide lubricity allowing the fibers to slide easily during the lay-up, needling and/or preforming/compaction process. Sizing agents of the present disclosure include water soluble polymers. The sizing agent may comprise a water solution. The sizing agent may comprise long chain alcohols such as polyvinyl alcohols, modified starch, cellulose gum such as carboxymethyl cellulose, modified wax, acrylates, and/or mixtures thereof. In various embodiments, up to about 700 mL (23.7 fluid oz) of water or more may be applied to the fibrous preform 102, though the amount of water is a variable parameter based on a variety of factors, including the size and volume of the fibrous preform 102. In various embodiments, approximately 1 milliliter (ml) of water may be added for every 2.5 cubic inches of fibrous preform (1 ml/2.5 in$^3$), wherein the term approximately as used in this context can only mean±0.5 ml. Stated differently, between 0.5 ml and 1.5 ml of water may be added to the fibrous preform for every 2.5 cubic inches of fibrous preform. However, it should be understood that other amounts of water or sizing agent may be added to the fibrous preform without departing from the scope of the present disclosure. Moreover, the fibrous preform may be preconditioned in a humidity chamber at a humidifying temperature (e.g., between 100° F. (37.8° C.) and 200° F. (93.3° C.)) and a relative humidity (e.g., between 75% and 90% humidity). Adding the sizing agent to the fibrous preform 102 may tend to reduce wrinkling of the fibrous preform 102 and support stabilizing the preform into the desired shape during the needling and shape-forming stages. In this manner, the fibrous preform 102 may be compressed to the desired fiber volume more easily and formed to shape using heat, moisture, pressure, stripper plate 120, and base plate 110, into the contoured shapes as desired for a particular C/C part application. In various embodiments, the sizing agents may also provide lubricity between the fibrous preform 102 and stripper plate 120 and/or between the fibrous preform 102 and base plate 110, preventing the fibrous preform 102 from sticking to the stripper plate 120 and/or the base plate 110, respectively.

Figure 11:
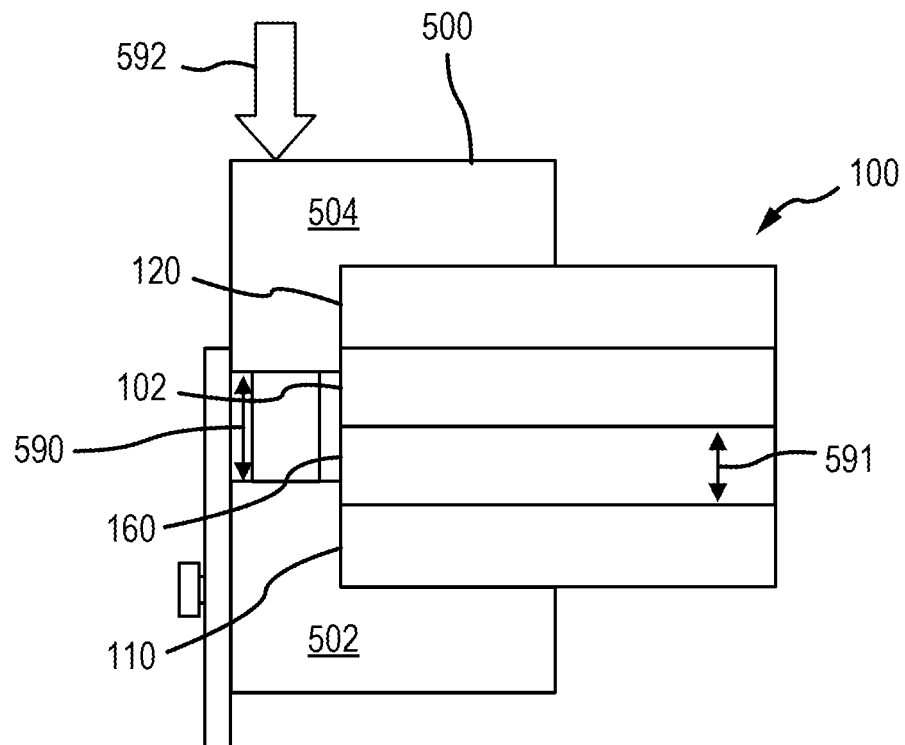
FIG. 11 is a section view of the composite clamp in an installed position prior to a foam backing layer being removed, in accordance with various embodiments.

In various embodiments, foam backing layer 160 or foam infill layer 170 may be made of a foam material that burns cleanly during the carbonization/heat-treatment or densification process (depending on which process is used immediately following z-needling). In this regard, foam backing layer 160 or foam infill layer 170 may burn away cleanly during the carbonization/heat-treatment or densification process—leaving just the fibrous preform 102, stripper plate 120, and base plate 110. To accommodate shrinking of the fibrous preform 102 and/or burning away of the foam (particularly when foam backing layer 160 is used), graphite and/or C/C composite clamps may be used to maintain compression on fibrous preform 102. For example, with reference to FIG. 10, a composite clamp 500 is illustrated, in accordance with various embodiments. Clamp 500 includes a first clamp half 502 and a second clamp half 504 moveable with respect to the first clamp half 502. A guide shaft 506 may extend from first clamp half 502 and into a guide slot or aperture 508 disposed in second clamp half 504. Guide shaft 506 may align second clamp half 504 with first clamp half 502 and guide relative translation of second clamp half 504 with respect to first clamp half 502. FIG. 11 is a section view of clamp 500 installed over base plate 110 and stripper plate 120. In this illustrated embodiment, foam backing layer 160 is installed between base plate 110 and fibrous preform 102. In this installed position, and prior to heat-treatment or densification, second clamp half 504 is spaced apart from first clamp half 502 by a distance 590 which is greater than the thickness 591 of foam backing layer 160. In this manner, clamp 500 may close (i.e., second clamp half 504 moves toward first clamp half 502, thereby closing, or partially closing, the distance 590) as the foam backing layer is burned away in response to being heated to heat-treatment or densification temperatures. Moreover, distance 590 may be configured to accommodate shrinking of fibrous preform 102. During the heat-treatment and/or densification steps, a force—represented by arrow 592—may be applied to clamp 500 to maintain compression on the fibrous preform 102 to set preform thickness and/or fiber volume as the foam backing layer 160 burns away, for example using a dead weight, a press, or the like. In this regard, the second clamp half 504 may be biased toward the first clamp half 502 while the preform tooling arrangement 100 is in the heat-treatment and/or densification furnace.

In various embodiments, after the z-needling process, foam backing layer 160 or foam infill layer 170 may be washed away in a water bath. In this regard, the foam backing layer 160 and/or foam infill layer 170 may comprise a washable foam. Removing the foam before heat-treatment and/or densification may tend to be desirable over burning away the foam in the furnace.

In step 406, the fibrous preform 102 undergoes a heat-treatment process, particularly when the fibrous preform 102 is not already entirely, or nearly entirely (e.g., greater than 99%), carbon and contains no to very small amounts (<1%) sizing agents or resin binders. In this regard, step 406 may be optional. Stated differently, step 406 may be skipped when fibrous preform 102 is made of higher purity or high temperature carbon fibers.

Step 406 may be performed with fibrous preform 102 secured in compression within preform tooling arrangement 100, particularly where preform tooling arrangement 100 is made from a graphite material, a C/C material, or other material suitable for withstanding heat-treatment and densification temperatures. The fibrous preform 102 (now a shaped body) may be heat treated to fully convert the fibrous preform 102 to a carbon preform. In various embodiments, fibrous preform 102 together with preform tooling arrangement 100 may be placed in a furnace for heat-treatment. The heat-treatment process may be employed to convert the fibers of the fibrous preform 102 into pure carbon fibers and to drive off any volatile species present in the fibrous preform 102, for example, moisture and oxygen, hydrogen or nitrogen species present in the sizing agents. As used herein only "pure carbon fibers" means carbon fibers comprised of at least 95% carbon. Since the heat-treatment step helps to drive off most of the elements other than carbon from the fibrous preform, the heat-treatment process is sometimes referred to as carbonization. As used herein, heat-treatment and carbonization may be used interchangeably. The carbonization or heat-treatment process is distinguished from the densification process described below in that the densification process involves infiltrating the pores of the fibrous preform 102 and depositing a carbon matrix within and around the carbon fibers of the fibrous preform 102, and the heat treatment or carbonization process refers to the process of converting the fibers of the fibrous preform 102 into pure carbon fibers.

The shape-formed fibrous preform 102 may be carbonized/heat-treated by placing the shape-formed fibrous preform 102 in a furnace with an inert atmosphere. In general, the carbonization process involves heating the shape-formed fibrous preform 102 in a furnace to a carbonization/heat-treatment temperature greater than about 1,000 degrees Celsius (1,832 Fahrenheit). Typically, an inert atmosphere of nitrogen, argon or a vacuum is provided in the furnace during the carbonization/heat-treatment process. The heat of the furnace converts the fibers to purer carbon fibers and drives off other chemicals. Although it is sometimes preferred that the fibers in the heat-treated fiber preform be 100% carbon fiber, it is generally acceptable for a less than full conversion to take place. The resulting heat-treated fiber preform generally has the same fibrous structure as the fibrous preform 102 before heat-treatment. During heat-treatment, the total mass and the total fiber volume in each fibrous preform 102 is typically reduced in proportion to the non-carbon compounds present in the fibrous preform 102 and driven off during the heat-treatment process.

In step 408, the fibrous preform 102 (or heat-treated fibrous preform if step 406 is utilized) undergoes a CVI densification process. Step 408 may be performed after step 406 (or after step 404 when fibrous preform 102 is made from carbon fibers and step 406 is omitted). In this regard, the same preform tooling arrangement 100 may be conveniently used for shape-forming, z-needling, carbonization (optional), and CVI densification.

In general, densification involves filling the voids, or pores, of the fibrous preform 102 with additional carbon material. This may be done using the same furnace used for heat-treatment or a different furnace. Typically, chemical vapor infiltration and deposition ("CVI/CVD") techniques are used to densify the porous fibrous preform 102 with a carbon matrix. This commonly involves heating the furnace and the carbonized preforms, and flowing hydrocarbon gases (e.g., at least one of methane, ethane, propane, butane, and/or the like, as described herein) into the furnace and around and through the fibrous preforms. In various embodiments, the CVI/CVD process may include a temperature gradient. In various embodiments, the CVI/CVD process may include a pressure gradient. In various embodiments, the CVI/CVD process may include a temperature and a pressure gradient.

CVI/CVD densification may be conducted in a vacuum or partial vacuum (e.g., at pressures of 1-15 torr) or in an inert atmosphere at a densification temperature in the range from about 650° C. to about 1425° C. (1,200° F. to about 2,600° F.), and in various embodiments in a range of about 900° C. to about 1100° C. (1,652° F. to about 2,012° F.), and in various embodiments in a range of about 815° C. to about 1040° C. (1,500° F. to about 1,900° F.), and in various embodiments in the range of up to about 1,000° C. (1,832° F.) (wherein the term about in this context only means+/−100° C.) for a period of time in the range from about 150 hours to about 650 hours, and in various embodiments, in the range from about 300 hours to about 500 hours (wherein the term about in this context only means+/−24 hours).

As a result, carbon from the hydrocarbon gases separates from the gases and is deposited on and within the fibrous preforms. Typically, the densification process is continued until the preform reaches a density in the range from 1.6 to 1.9 grams per cubic centimeter (g/cc), and in various embodiments, a density of approximately 1.80 g/cc. When the densification step is completed, the resulting C/C part has a carbon fiber structure with a carbon matrix infiltrating the fiber structure, thereby deriving the name "carbon/carbon."

Figure 12:
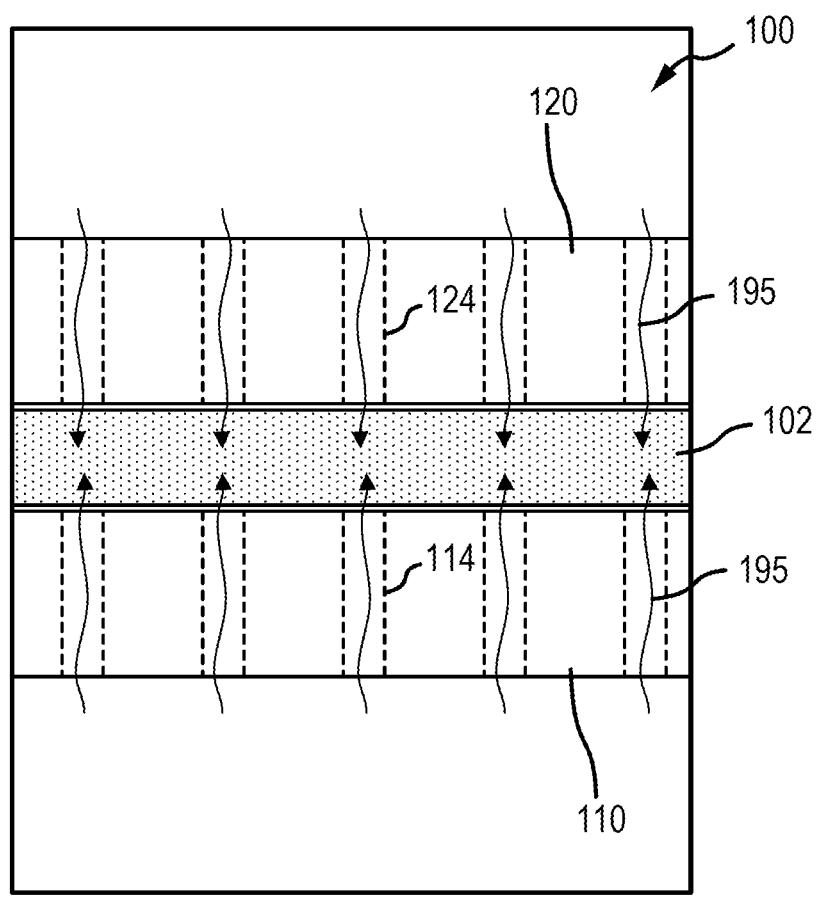
FIG. 12 is a section view of a fibrous preform installed in a tooling arrangement of the present disclosure during a densification process, in accordance with various embodiments.

FIG. 12 is, in accordance with various embodiments, a section view of a portion of the preform tooling arrangement 100 during a densification process. Perforations 124 in stripper plate 120 and perforations 114 in base plate 110 aid in allowing the hydrocarbon gases 195 to infiltrate throughout the fibrous preform 102 during densification. In this regard, perforations 114 and/or perforations 124 may serve a dual purpose for z-needling and densification. In this regard, step 408 may further include flowing hydrocarbon gases 195 through perforations 114 and/or perforations 124 and into fibrous preform 102.

After a first CVI/CVD cycle of 50 to 500 hours, an intermediate heat treat may be performed, in the same furnace. This heat treat (>1600° C.) serves to dimensionally stabilize the fibrous preform 102, increase its thermal properties, and increase its porosity for subsequent densification. The fibrous preform 102 may then be taken out of the tool-assembly. That is the fibrous preform 102 with the CVI/CVD carbon may be separated from the stripper plate 120 and the base plate 110 and any clamps 500. The outer surfaces of the fibrous preform 102 may be machined to open the porosity further, to help allow for final density to be achieved using only one more CVI/CVD cycle, with or without the tooling assembly around the fibrous preform 102. Part densities after first machining may be in the range of 1.4 to 1.7 g/cc, depending on the part thickness, overall size, and placement within the furnace. Typical, average density range is 1.55-1.65 g/cc.

The densification process may be continued until the preform reaches a desired density, for example in the range from 1.7 to 1.9 grams per cubic centimeter (g/cc), and in various embodiments, a density of approximately 1.80 g/cc. The CVI/CVD process may be continued with the fibrous preform 102 removed from the perforated graphite fixture. In this manner, the outer surfaces of the fibrous preform 102 may be more directly exposed to the gas flow. Moreover, the fibrous preform 102 may be machined in between carbon CVI densification processes (e.g., between fixtured carbon CVI densification and non-fixtured carbon CVI densification and/or between successive non-fixtured carbon CVI densification processes). Machining (e.g., grinding, sanding, milling, grit blasting, etc.) the fibrous preform 102 may be performed to achieve a final desired part shape. Machining the fibrous preform 102 may be performed to expose voids, or pores, of the fibrous preform 102 so as to facilitate infiltration with additional carbon material during subsequent carbon CVI densification. When the densification step is completed, and the desired density is achieved, the resulting C/C part has a carbon fiber structure with a carbon matrix infiltrating the fiber structure, thereby deriving the name "carbon/carbon."

Following the CVI/CVD densification process, the C/C part may undergo a final heat treatment (FHT) process. This may be done using the same furnace used for densification or a different furnace. If done using the same furnace, the flow of hydrocarbon gases would be stopped following the end of the densification process and the temperature increased. FHT may be conducted in a vacuum or partial vacuum (e.g., at pressures of 1-15 torr) or in an inert atmosphere at a temperature in the range from about 1200° C. to about 2600° C. (2,921° F. to about 4,712° F.), and in various embodiments in the range from about 1400° C. to about 2200° C. (2,552° F. to about 3,992° F.) (wherein the term about in this context only means+/−100° C.) for a period of time in the range from about 4 hours to about 14 hours, and in various embodiments, in the range from about 8 hours to about 12 hours (wherein the term about in this context only means+/−2 hours). In various embodiments, the FHT process imparts high temperature dimensional stability to the final C/C part. In various embodiments, the FHT process imparts desired thermal properties associated with thermal shock such as high thermal conductivity, high heat capacity, and/or high emissivity.

Figure 13:
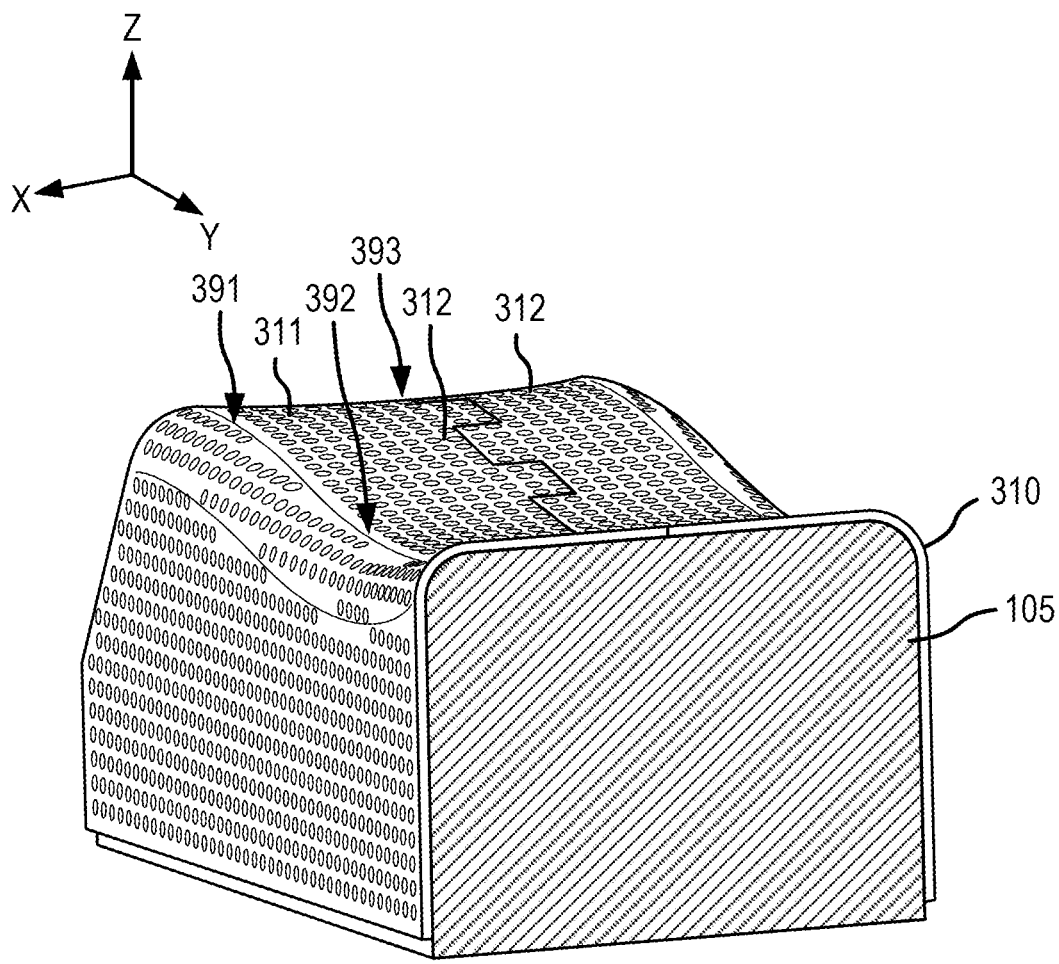
FIG. 13 is a perspective view of base plate installed over a support structure, wherein the base plate defines a male die surface having concave and convex sub-regions, in accordance with various embodiments.

With reference to FIG. 13, a base plate 310 is illustrated installed over a support structure 105, in accordance with various embodiments. Although illustrated as have base plate sub-components 311, 312, base plate 310 may also comprise a single piece base plate, or may comprise any number of base plate sub-components, in accordance with various embodiments. In various embodiments, the male die surface 312 may feature sub-regions that are locally concave together with regions that are convex along a direction of the die surface. Stated differently, a first sub-region 391 (along the Y-direction; also referred to as the longitudinal direction) of base plate 310 can be convex and a second sub-region 392 (along the Y-direction) of base plate 310 can be concave. In various embodiments, the male die surface 312 may be convex in one direction (see first sub-region 391 along the Y-direction) and concave in a different direction of the male die surface 312 (see third sub-region which is concave along the X-direction).

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A preform tooling arrangement, comprising:
   a base plate comprising a male die surface;
   a stripper plate comprising a female die surface, an outer surface, a first wall, and a second wall oriented at a non-parallel angle with respect to the first wall, the stripper plate is moveable with respect to the base plate;
   a first plurality of perforations disposed in the base plate;
   a second plurality of perforations disposed in the stripper plate, the second plurality of perforations includes a plurality of first wall perforations extending through the first wall and a plurality of second wall perforations extending through the second wall; and
   at least one textile needle movable with respect to the base plate and the stripper plate;
   wherein the preform tooling arrangement is configured to receive a fibrous preform between the male die surface and the female die surface, and each perforation of at least one of the first plurality of perforations or the second plurality of perforations is configured to receive the at least one textile needle for needling of the fibrous preform while the fibrous preform is secured in compression between the base plate and the stripper plate; and
   at least one of the first plurality of perforations or the second plurality of perforations comprises:
      a first zone with a first perforation density; and
      a second zone with a second perforation density, the first perforation density is higher than the second perforation density, and the perforations in the first zone and the second zone are configured to receive the textile needle.

2. The preform tooling arrangement of claim 1, wherein:
   the first plurality of perforations extend from the male die surface to a recess surface in the base plate; and
   the second plurality of perforations extend from the female die surface to the outer surface in the stripper plate.

3. The preform tooling arrangement of claim 2, further comprising a support structure, wherein the base plate is configured to receive the support structure against the recess surface.

4. The preform tooling arrangement of claim 1, wherein at least one of:
   the base plate comprises a plurality of base plate sub-components that are configured together to define the male die surface; or the stripper plate comprises a plurality of stripper plate sub-components that are configured together to define the female die surface.

5. The preform tooling arrangement of claim 4, wherein the plurality of stripper plate sub-components includes a first half of the stripper plate and a second half of the stripper plate, the first half is moveable with respect to the second half.

6. The preform tooling arrangement of claim 5, wherein the first half comprises a first plurality of teeth and the second half comprises a second plurality of teeth configured to interlock with the first plurality of teeth.

7. The preform tooling arrangement of claim 1, wherein:
each of the second plurality of perforations are sized and configured to receive the textile needle; and
each of the first plurality of perforations are sized and configured to receive the textile needle.

8. The preform tooling arrangement of claim 7, wherein:
a center axis of each perforation of the first plurality of perforations is aligned with a center axis of a corresponding perforation of the second plurality of perforations; and
each perforation of the second plurality of perforations disposed in the stripper plate is configured to receive the textile needle therethrough, whereby the textile needle penetrates through the fibrous preform and at least partially through the corresponding perforation of the first plurality of perforations disposed in the base plate.

9. The preform tooling arrangement of claim 1, wherein the male die surface is a convex surface and the female die surface is a concave surface.

10. The preform tooling arrangement of claim 1, wherein:
the base plate comprises at least one of a metallic material, a graphite material, a C/C composite material, or a ceramic matrix composite material; and
the stripper plate comprises at least one of the metallic material, the graphite material, the C/C composite material, or the ceramic matrix composite material.

11. The preform tooling arrangement of claim 1, wherein the first plurality of perforations and the second plurality of perforations comprise perforated zones alternating with non-perforated zones.

12. The preform tooling arrangement of claim 1, wherein at least one of the first plurality of perforations or the second plurality of perforations are arranged in a pattern, and wherein the pattern comprises at least one of a rectangular pattern, a hexagonal pattern, a triangular pattern, or a circular pattern.

13. The preform tooling arrangement of claim 1, wherein the first plurality of perforations cover between 50-99% of the base plate and the second plurality of perforations cover between 50-99% of the stripper plate.

14. The preform tooling arrangement of claim 1, wherein at least one of the first plurality of perforations or the second plurality of perforations comprise round holes of between 0.05 inch and 0.75 inch in diameter.

15. The preform tooling arrangement of claim 1, wherein the first plurality of perforations comprise between 20%-75% of a total surface area of the base plate.

16. The preform tooling arrangement of claim 15, wherein the second plurality of perforations comprise between 20%-75% of a total surface area of the stripper plate.

17. The preform tooling arrangement of claim 1, further comprising a clamp configured to bias the base plate toward the stripper plate, the clamp comprises a first clamp half moveable with respect to a second clamp half, and the first clamp half is configured to move toward the second clamp half while the fibrous preform is in a furnace.

18. The preform tooling arrangement of claim 1, further comprising a foam layer configured to be disposed between the fibrous preform and the base plate while the fibrous preform receives the textile needle.

19. The preform tooling arrangement of claim 1, wherein the base plate further comprises a first base plate wall and a second base plate wall oriented at the non-parallel angle with respect to the first base plate wall.

20. A preform tooling arrangement, comprising:
a base plate comprising a male die surface;
a stripper plate comprising a female die surface, an outer surface, a first wall, and a second wall oriented at a non-parallel angle with respect to the first wall, the stripper plate is moveable with respect to the base plate;
a first plurality of perforations disposed in the base plate;
a second plurality of perforations disposed in the stripper plate, the second plurality of perforations includes a plurality of first wall perforations extending through the first wall and a plurality of second wall perforations extending through the second wall;
a clamp configured to bias the base plate toward the stripper plate, the clamp comprises a first clamp half moveable with respect to a second clamp half, and the first clamp half is configured to move toward the second clamp half while a fibrous preform is in a furnace; and
at least one textile needle movable with respect to the base plate and the stripper plate;
wherein the preform tooling arrangement is configured to receive the fibrous preform between the male die surface and the female die surface, and each perforation of at least one of the first plurality of perforations or the second plurality of perforations is configured to receive the at least one textile needle for needling of the fibrous preform while the fibrous preform is secured in compression between the base plate and the stripper plate.

21. A preform tooling arrangement, comprising:
a base plate comprising a male die surface;
a stripper plate comprising a female die surface, an outer surface, a first wall, and a second wall oriented at a non-parallel angle with respect to the first wall, the stripper plate is moveable with respect to the base plate;
a first plurality of perforations disposed in the base plate;
a second plurality of perforations disposed in the stripper plate, the second plurality of perforations includes a plurality of first wall perforations extending through the first wall and a plurality of second wall perforations extending through the second wall;
a foam layer configured to be disposed between a fibrous preform and the base plate while the fibrous preform receives the textile needle; and
at least one textile needle movable with respect to the base plate and the stripper plate;
wherein the preform tooling arrangement is configured to receive the fibrous preform between the male die surface and the female die surface, and each perforation of at least one of the first plurality of perforations or the second plurality of perforations is configured to receive the at least one textile needle for needling of the fibrous preform while the fibrous preform is secured in compression between the base plate and the stripper plate.

22. A preform tooling arrangement, comprising:
a base plate comprising a male die surface;
a stripper plate comprising a female die surface, an outer surface, a first wall, and a second wall oriented at a non-parallel angle with respect to the first wall, the stripper plate is moveable with respect to the base plate;
a first plurality of perforations disposed in the base plate;
a second plurality of perforations disposed in the stripper plate, the second plurality of perforations includes a plurality of first wall perforations extending through the first wall and a plurality of second wall perforations extending through the second wall; and
at least one textile needle movable with respect to the base plate and the stripper plate;
wherein the preform tooling arrangement is configured to receive a fibrous preform between the male die surface and the female die surface, and each perforation of at least one of the first plurality of perforations or the second plurality of perforations is configured to receive the at least one textile needle for needling of the fibrous preform while the fibrous preform is secured in compression between the base plate and the stripper plate;

wherein at least one of:

the base plate comprises a plurality of base plate sub-components that are configured together to define the male die surface; or the stripper plate comprises a plurality of stripper plate sub-components that are configured together to define the female die surface, and the plurality of stripper plate sub-components includes a first half of the stripper plate and a second half of the stripper plate, the first half is moveable with respect to the second half.

23. The preform tooling arrangement of claim 22, wherein the first half comprises a first plurality of teeth and the second half comprises a second plurality of teeth configured to interlock with the first plurality of teeth.

* * * * *